US010941269B2

(12) United States Patent
Layman et al.

(10) Patent No.: US 10,941,269 B2
(45) Date of Patent: *Mar. 9, 2021

(54) METHOD FOR PURIFYING RECLAIMED POLYETHYLENE

(71) Applicant: The Procter & Gamble Company, Cincinnati, OH (US)

(72) Inventors: John Moncrief Layman, Liberty Township, OH (US); Dimitris Ioannis Collias, Mason, OH (US); Hans Schonemann, Newburyport, MA (US); Kara Williams, South Weymouth, MA (US)

(73) Assignee: The Procter & Gamble Company, Cincinnati, OH (US)

( * ) Notice: Subject to any disclaimer, the term of this patent is extended or adjusted under 35 U.S.C. 154(b) by 77 days.

This patent is subject to a terminal disclaimer.

(21) Appl. No.: 16/423,226

(22) Filed: May 28, 2019

(65) Prior Publication Data

US 2019/0390032 A1    Dec. 26, 2019

Related U.S. Application Data

(60) Provisional application No. 62/687,388, filed on Jun. 20, 2018.

(51) Int. Cl.
 *C08J 11/08* (2006.01)
 *B01D 11/02* (2006.01)
 *B01D 21/00* (2006.01)
 *B01J 3/04* (2006.01)

(52) U.S. Cl.
 CPC .......... *C08J 11/08* (2013.01); *B01D 11/0284* (2013.01); *B01D 11/0288* (2013.01); *B01D 21/0012* (2013.01); *B01J 3/04* (2013.01); *C08J 2323/06* (2013.01); *C08J 2323/08* (2013.01)

(58) Field of Classification Search
 USPC .................................................. 521/40.5, 47
 See application file for complete search history.

(56) References Cited

U.S. PATENT DOCUMENTS

| | | | |
|---|---|---|---|
| 2,914,453 A | 11/1959 | Wennerberg | |
| 2,978,442 A | 4/1961 | Nixon | |
| 3,001,977 A | 9/1961 | Wisseroth | |
| 5,198,471 A | 3/1993 | Nauman | |
| 5,739,270 A | 4/1998 | Farmer | |
| 5,994,417 A | 11/1999 | Roberts | |
| 6,555,588 B2 | 4/2003 | Gorski | |
| 7,935,736 B2 | 5/2011 | Maeurer | |
| 9,695,259 B2* | 7/2017 | Layman | C08J 11/08 |
| 9,803,035 B2* | 10/2017 | Layman | C08F 10/06 |
| 9,890,225 B2* | 2/2018 | Layman | C08F 6/02 |
| 9,982,066 B2* | 5/2018 | Layman | B29B 17/02 |
| 10,435,532 B2* | 10/2019 | Layman | C08J 11/06 |
| 10,442,912 B2* | 10/2019 | Layman | C08J 11/08 |
| 10,450,436 B2* | 10/2019 | Layman | C08J 11/08 |
| 10,465,058 B2* | 11/2019 | Layman | C08J 11/06 |
| 2001/0044520 A1 | 11/2001 | Suzuki | |
| 2002/0128394 A1 | 9/2002 | Gorski et al. | |
| 2017/0002110 A1* | 1/2017 | Layman | C08F 6/10 |
| 2017/0002111 A1 | 1/2017 | Layman | |
| 2017/0002116 A1* | 1/2017 | Layman | D01F 6/30 |
| 2017/0002117 A1* | 1/2017 | Layman | B29B 17/02 |
| 2017/0002118 A1 | 1/2017 | Layman | |
| 2017/0002119 A1* | 1/2017 | Layman | C08F 6/008 |
| 2018/0171094 A1 | 6/2018 | Layman | |
| 2018/0171095 A1* | 6/2018 | Layman | C08J 11/06 |
| 2018/0171096 A1* | 6/2018 | Layman | C08J 11/08 |
| 2018/0171097 A1* | 6/2018 | Layman | C08J 11/06 |
| 2019/0390031 A1* | 12/2019 | Layman | B01J 3/04 |
| 2019/0390032 A1* | 12/2019 | Layman | C08J 11/08 |
| 2019/0390033 A1* | 12/2019 | Layman | C08J 11/08 |

FOREIGN PATENT DOCUMENTS

| | | |
|---|---|---|
| EP | 0849312 A1 | 6/1998 |
| JP | H11263870 A | 9/1999 |
| JP | 3579099 B2 | 7/2004 |
| JP | 3669803 B2 | 4/2005 |
| WO | WO200077082 A1 | 12/2000 |

OTHER PUBLICATIONS

All Office Actions, U.S. Appl. No. 15/839,911.
International Search Report and Written Opinion, U.S. Appl. No. 16/423,226, dated Sep. 6, 2019, 10 pgs.

* cited by examiner

*Primary Examiner* — Terressa Boykin
(74) *Attorney, Agent, or Firm* — James E Oehlenschlager

(57) ABSTRACT

A method for purifying a reclaimed polyethylene is disclosed. In one embodiment, the method involves obtaining reclaimed polyethylene, contacting the reclaimed polyethylene with a first fluid solvent to produce an extracted reclaimed polyethylene; then dissolving the extracted reclaimed polyethylene in a solvent to produce a first solution comprising polyethylene. The first solution is settled and then filtered. A purer polyethylene is separated from the resulting solution.

20 Claims, 2 Drawing Sheets

METHOD FOR PURIFYING RECLAIMED POLYETHYLENE

FIELD OF THE INVENTION

The present invention generally relates to a method for purifying contaminated polymers through the use of a pressurized solvent, settling, and/or filtration. More specifically, this invention relates to a method for purifying recycled polymers, such as post-consumer and post-industrial recycled plastics, to produce a colorless or clear, odor free, virgin-like polymer. It is particularly useful for the purification of polyethylene.

BACKGROUND OF THE INVENTION

Polymers, especially synthetic plastics, are ubiquitous in daily life due to their relatively low production costs and good balance of material properties. Synthetic plastics are used in a wide variety of applications, such as packaging, automotive components, medical devices, and consumer goods. To meet the high demand of these applications, tens of billions of pounds of synthetic plastics are produced globally on an annual basis. The overwhelming majority of synthetic plastics are produced from increasingly scarce fossil sources, such as petroleum and natural gas. Additionally, the manufacturing of synthetic plastics from fossil sources produces $CO_2$ as a by-product.

The ubiquitous use of synthetic plastics has consequently resulted in millions of tons of plastic waste being generated every year. While the majority of plastic waste is landfilled via municipal solid waste programs, a significant portion of plastic waste is found in the environment as litter, which is unsightly and potentially harmful to ecosystems. Plastic waste is often washed into river systems and ultimately out to sea.

Plastics recycling has emerged as one solution to mitigate the issues associated with the wide-spread usage of plastics. Recovering and re-using plastics diverts waste from landfills and reduces the demand for virgin plastics made from fossil-based resources, which consequently reduces greenhouse gas emissions. In developed regions, such as the United States and the European Union, rates of plastics recycling are increasing due to greater awareness by consumers, businesses, and industrial manufacturing operations. The majority of recycled materials, including plastics, are mixed into a single stream which is collected and processed by a material recovery facility (MRF). At the MRF, materials are sorted, washed, and packaged for resale. Plastics can be sorted into individual materials, such as high-density polyethylene (HDPE) or poly(ethylene terephthalate) (PET), or mixed streams of other common plastics, such as polypropylene (PP), low-density polyethylene (LDPE), poly(vinyl chloride) (PVC), polystyrene (PS), polycarbonate (PC), and polyamides (PA). The single or mixed streams can then be further sorted, washed, and reprocessed into a pellet that is suitable for re-use in plastics processing, for example blow and injection molding.

Though recycled plastics are sorted into predominately uniform streams and are washed with aqueous and/or caustic solutions, the final reprocessed pellet often remains highly contaminated with unwanted waste impurities, such as spoiled food residue and residual perfume components. In addition, recycled plastic pellets, except for those from recycled beverage containers, are darkly colored due to the mixture of dyes and pigments commonly used to colorize plastic articles. While there are some applications that are insensitive to color and contamination (for example black plastic paint containers and concealed automotive components), the majority of applications require non-colored pellets. The need for high quality, "virgin-like" recycled resin is especially important for food and drug contact applications, such as food packaging. In addition to being contaminated with impurities and mixed colorants, many recycled resin products are often heterogeneous in chemical composition and may contain a significant amount of polymeric contamination, such as recycled polypropylene contamination in polyethylene and vice versa.

Mechanical recycling, also known as secondary recycling, is the process of converting recycled plastic waste into a re-usable form for subsequent manufacturing. A more detailed review of mechanical recycling and other plastics recovery processes are described in S. M. Al-Salem, P. Lettieri, J. Baeyens, "Recycling and recovery routes of plastic solid waste (PSW): A review", Waste Management, Volume 29, Issue 10, October 2009, Pages 2625-2643, ISSN 0956-053X. While advances in mechanical recycling technology have improved the quality of recycled polymers to some degree, there are fundamental limitations of mechanical decontamination approaches, such as the physical entrapment of pigments within a polymer matrix. Thus, even with the improvements in mechanical recycling technology, the dark color and high levels of chemical contamination in currently available recycled plastic waste prevents broader usage of recycled resins by the plastics industry.

To overcome the fundamental limitations of mechanical recycling, there have been many methods developed to purify contaminated polymers via chemical approaches, or chemical recycling. Most of these methods use solvents to decontaminate and purify polymers. The use of solvents enables the extraction of impurities and the dissolution of polymers, which further enables alternative separation technologies.

For example, U.S. Pat. No. 7,935,736 describes a method for recycling polyester from polyester-containing waste using a solvent to dissolve the polyester prior to cleaning. The '736 patent also describes the need to use a precipitant to recover the polyester from the solvent.

In another example, U.S. Pat. No. 6,555,588 describes a method to produce a polypropylene blend from a plastic mixture comprised of other polymers. The '588 patent describes the extraction of contaminants from a polymer at a temperature below the dissolution temperature of the polymer in the selected solvent, such as hexane, for a specified residence period. The '588 patent further describes increasing the temperature of the solvent (or a second solvent) to dissolve the polymer prior to filtration. The '588 patent yet further describes the use of shearing or flow to precipitate polypropylene from solution. The polypropylene blend described in the '588 patent contained polyethylene contamination up to 5.6 wt %.

In another example, European Patent Application No. 849,312 (translated from German to English) describes a process to obtain purified polyolefins from a polyolefin-containing plastic mixture or a polyolefin-containing waste. The '312 patent application describes the extraction of polyolefin mixtures or wastes with a hydrocarbon fraction of gasoline or diesel fuel with a boiling point above 90° C. at temperatures between 90° C. and the boiling point of the hydrocarbon solvent. The '312 patent application further describes contacting a hot polyolefin solution with bleaching clay and/or activated carbon to remove foreign components from the solution. The '312 patent yet further describes cooling the solution to temperatures below 70° C. to crystallize the polyolefin and then removing adhering solvent by heating the polyolefin above the melting point of the polyolefin, or evaporating the adhering solvent in a vacuum or passing a gas stream through the polyolefin precipitate, and/or extraction of the solvent with an alcohol or ketone that boils below the melting point of the polyolefin.

In another example, U.S. Pat. No. 5,198,471 describes a method for separating polymers from a physically commingled solid mixture (for example waste plastics) containing a plurality of polymers using a solvent at a first lower temperature to form a first single phase solution and a remaining solid component. The '471 patent further describes heating the solvent to higher temperatures to dissolve additional polymers that were not solubilized at the first lower temperature. The '471 patent describes filtration of insoluble polymer components.

In another example, U.S. Pat. No. 5,233,021 describes a method of extracting pure polymeric components from a multi-component structure (for example waste carpeting) by dissolving each component at an appropriate temperature and pressure in a supercritical fluid and then varying the temperature and/or pressure to extract particular components in sequence. However, similar to the '471 patent, the '021 patent only describes filtration of undissolved components.

In another example, U.S. Pat. No. 5,739,270 describes a method and apparatus for continuously separating a polymer component of a plastic from contaminants and other components of the plastic using a co-solvent and a working fluid. The co-solvent at least partially dissolves the polymer and the second fluid (that is in a liquid, critical, or supercritical state) solubilizes components from the polymer and precipitates some of the dissolved polymer from the co-solvent. The '270 patent further describes the step of filtering the thermoplastic-co-solvent (with or without the working fluid) to remove particulate contaminants, such as glass particles.

The known solvent-based methods to purify contaminated polymers, as described above, do not produce "virgin-like" polymer. In the previous methods, co-dissolution and thus cross contamination of other polymers often occurs. If adsorbent is used, a filtration and/or centrifugation step is often employed to remove the used adsorbent from solution. In addition, isolation processes to remove solvent, such as heating, vacuum evaporation, and/or precipitation using a precipitating chemical are used to produce a polymer free of residual solvent.

Accordingly, a need still exists for an improved solvent-based method to purify contaminated polymers that uses a solvent that is readily and economically removed from the polymer, is relatively simple in terms of the number of unit operations, produces a polymer without a significant amount of polymeric cross contamination, produces a polymer that is essentially colorless, and produces a polymer that is essentially odorless.

SUMMARY OF THE INVENTION

A method for purifying a reclaimed polyethylene is disclosed. In one embodiment, the method involves obtaining reclaimed polyethylene where the reclaimed polyethylene is selected from the group consisting of post-consumer use polymers, post-industrial use polymers, and combinations thereof; contacting the reclaimed polyethylene at a temperature from about 80° C. to about 280° C. and at a pressure from about 150 psig (1.03 MPa) to about 8,000 psig (55.16 MPa) with a first fluid solvent having a standard boiling point less than about 70° C., to produce an extracted reclaimed polyethylene; dissolving the extracted reclaimed polyethylene in a solvent selected from the group consisting of the first fluid solvent, a second fluid solvent, and mixtures thereof, at a temperature from about 90° C. to about 280° C. and a pressure from about 200 psig (1.38 MPa) to about 8,000 psig (55.16 MPa) to produce a first solution comprising polyethylene, at least one dissolved contaminant, and at least one suspended contaminant; settling the first solution comprising polyethylene, at least one dissolved contaminants, and at least one suspended contaminant at a temperature from about 90° C. to about 280° C. and at a pressure from about 200 psig (1.38 MPa) to about 8,000 psig (55.16 MPa) to produce a second solution comprising polyethylene, at least one dissolved contaminant, and less of the at least one suspended contaminant; filtering the second solution at a temperature from about 90° C. to about 280° C. and at a pressure from about 200 psig (1.38 MPa) to about 8,000 psig (55.16 MPa) to produce a third solution comprising purer polyethylene, at least one dissolved contaminant, and even less of the at least one suspended contaminant; and separating the purer polyethylene from the third solution; and where the second fluid solvent has the same chemical composition or a different chemical composition as the first fluid solvent.

In another embodiment, the purer polyethylene is separated from the third solution at a temperature from about 0° C. to about 280° C. and a pressure from about 0 psig (0 MPa) to 2,000 psig (13.79 MPa). In another embodiment, the reclaimed polyethylene is dissolved in the fluid solvent, or fluid solvent mixture, at a mass percent concentration of at least 0.5%. In yet another embodiment, the reclaimed polyethylene is dissolved in the fluid solvent, or fluid solvent mixture, at a mass percent concentration of at least 1%. In one embodiment, the reclaimed polyethylene is dissolved in the fluid solvent, or fluid solvent mixture, at a mass percent concentration of at least 2%. In another embodiment, the reclaimed polyethylene is dissolved in the fluid solvent, or fluid solvent mixture, at a mass percent concentration of at least 3%. In yet another embodiment, the reclaimed polyethylene is dissolved in the fluid solvent, or fluid solvent mixture, at a mass percent concentration of at least 4%. In still another embodiment, the reclaimed polyethylene is dissolved in the fluid solvent, or fluid solvent mixture, at a mass percent concentration of at least 5%. In one embodiment, the reclaimed polyethylene is dissolved in the fluid solvent, or fluid solvent mixture, at a mass percent concentration up to 20%. In another embodiment, the reclaimed polyethylene is dissolved in the fluid solvent, or fluid solvent mixture, at a mass percent concentration up to 18%. In yet another embodiment, the reclaimed polyethylene is dissolved in the fluid solvent, or fluid solvent mixture, at a mass percent concentration up to 16%. In another embodiment, the reclaimed polyethylene is dissolved in the fluid solvent, or fluid solvent mixture, at a mass percent concentration up to 14%. In one embodiment, the reclaimed polyethylene is dissolved in the fluid solvent, or fluid solvent mixture, at a mass percent concentration up to 12%.

In another embodiment, the reclaimed polyethylene is post-consumer recycle derived polyethylene. In yet another embodiment, the reclaimed polyethylene is a polyethylene homopolymer or a primarily polyethylene copolymer.

In one embodiment, the fluid solvent has a standard boiling point less than about 0° C. and greater than about −45° C. and a standard enthalpy change of vaporization of less than about +25 kJ/mol. In another embodiment, the fluid solvent is selected from the group consisting of olefinic hydrocarbons, aliphatic hydrocarbons, and mixtures thereof.

In yet another embodiment, the aliphatic hydrocarbon is selected from the group consisting of C1-C6 aliphatic hydrocarbons and mixtures thereof. In still another embodiment, the aliphatic hydrocarbons and mixtures thereof is comprised of primarily C4 aliphatic hydrocarbons.

In another embodiment, the fluid solvent consists essentially of C4 liquefied petroleum gas. In yet another embodiment, the fluid solvent comprises n-butane, butane isomers, or mixtures thereof. In still another embodiment, the fluid solvent comprises n-pentane, isomers of pentane, or mixtures thereof.

In one embodiment, the temperature in the contacting, dissolving, settling and filtering steps is from about 110° C. to about 220° C. In another embodiment, the pressure in the contacting step is from about 400 psig (2.76 MPa) to about 2,400 psig (16.55 MPa). In yet another embodiment, the pressure in the contacting step is less than about 1,100 psig (7.58 MPa). In one embodiment, the pressure in the dissolving, settling, and filtering steps is from about 400 psig (2.76 MPa) to about 6,000 (41.37 MPa).

In one embodiment, the filtering is conducted in an axial flow direction. In another embodiment, the filtering is conducted in a radial flow direction. In yet another embodiment, the filtering is conducted in a candle-type filter apparatus. In another embodiment, the candle filter apparatus is pre-coated with a filtration aid. In one embodiment, the candle filter apparatus is pre-coated with a filtration aid selected from the group consisting of diatomaceous earth, perlite, cellulosic fiber, clay, activated carbon, alumina, silica, alumina silicate, zeolite, and mixtures thereof. In another embodiment, the candle filter apparatus is pre-coated with a filtration aid having a particle size from about 10 μm to about 100 μm.

In another embodiment, the filtering comprises body feeding one or more filtration aids. In yet another embodiment, the one or more filtration aids is selected from the group consisting of diatomaceous earth, perlite, cellulosic fiber, clay, activated carbon, alumina, silica, alumina silicate, zeolite, and mixtures thereof.

In another embodiment, a method for purifying a reclaimed polyethylene is disclosed. The method comprises obtaining the reclaimed polyethylene wherein the reclaimed polyethylene is selected from the group consisting of post-consumer use polymers, post-industrial use polymers, and combinations thereof; contacting the reclaimed polyethylene at a temperature from about 80° C. to about 280° C. and at a pressure from about 150 psig (1.03 MPa) to about 8,000 psig (55.16 MPa) with a first fluid solvent having a standard boiling point less than about 70° C., to produce an extracted reclaimed polyethylene; dissolving the extracted reclaimed polyethylene in a solvent selected from the group consisting of the first fluid solvent, a second fluid solvent, and mixtures thereof, at a temperature from about 90° C. to about 280° C. and a pressure from about 200 psig (1.38 MPa) to about 8,000 psig (55.16 MPa) to produce a first solution comprising polyethylene, at least one dissolved contaminant, and at least one suspended contaminant; settling the first solution comprising polyethylene, at least one dissolved contaminants, and at least one suspended contaminant at a temperature from about 90° C. to about 280° C. and at a pressure from about 200 psig (1.38 MPa) to about 8,000 psig (55.16 MPa) to produce a second solution comprising polyethylene, at least one dissolved contaminant, and less of the at least one suspended contaminant; filtering the second solution at a temperature from about 90° C. to about 280° C. and at a pressure from about 200 psig (1.38 MPa) to about 8,000 psig (55.16 MPa) to produce a third solution comprising purer polyethylene, at least one dissolved contaminant, and even less of the at least one suspended contaminant; and purifying by further filtering the third solution at a temperature from about 90° C. to about 280° C. and at a pressure from about 200 psig (1.38 MPa) to about 8,000 psig (55.16 MPa) by contacting the third solution with one or more solid media to produce a fourth solution comprising purer polyethylene; and separating the purer polyethylene from the fourth solution; and where the second fluid solvent has the same chemical composition or a different chemical composition as the first fluid solvent.

In another embodiment, the purer polyethylene is separated from the third solution at a temperature from about 0° C. to about 280° C. and a pressure from about 0 psig (0 MPa) to 2,000 psig (13.79 MPa). In yet another embodiment, the reclaimed polyethylene is dissolved in the fluid solvent, or fluid solvent mixture, at a mass percent concentration of at least 0.5%. In one embodiment, the reclaimed polyethylene is dissolved in the fluid solvent, or fluid solvent mixture, at a mass percent concentration of at least 1%. In another embodiment, the reclaimed polyethylene is dissolved in the fluid solvent, or fluid solvent mixture, at a mass percent concentration of at least 2%. In yet another embodiment, the reclaimed polyethylene is dissolved in the fluid solvent, or fluid solvent mixture, at a mass percent concentration of at least 3%. In still another embodiment, the reclaimed polyethylene is dissolved in the fluid solvent, or fluid solvent mixture, at a mass percent concentration of at least 4%. In one embodiment, the reclaimed polyethylene is dissolved in the fluid solvent, or fluid solvent mixture, at a mass percent concentration of at least 5%. In another embodiment, the reclaimed polyethylene is dissolved in the fluid solvent, or fluid solvent mixture, at a mass percent concentration up to 20%. In yet another embodiment, the reclaimed polyethylene is dissolved in the fluid solvent, or fluid solvent mixture, at a mass percent concentration up to 18%. In still another embodiment, the reclaimed polyethylene is dissolved in the fluid solvent, or fluid solvent mixture, at a mass percent concentration up to 16%. In one embodiment, the reclaimed polyethylene is dissolved in the fluid solvent, or fluid solvent mixture, at a mass percent concentration up to 14%. In another embodiment, the reclaimed polyethylene is dissolved in the fluid solvent, or fluid solvent mixture, at a mass percent concentration up to 12%.

In one embodiment, the reclaimed polyethylene is post-consumer recycle derived polyethylene. In another embodiment, the reclaimed polyethylene is a polyethylene homopolymer or a primarily polyethylene copolymer.

In another embodiment, the fluid solvent has a standard boiling point less than about 0° C. and greater than about −45° C. and a standard enthalpy change of vaporization of less than about +25 kJ/mol. In yet another embodiment, the fluid solvent is selected from the group consisting of olefinic hydrocarbons, aliphatic hydrocarbons, and mixtures thereof. In still another embodiment, the aliphatic hydrocarbon is selected from the group consisting of C1-C6 aliphatic hydrocarbons and mixtures thereof. In one embodiment, the aliphatic hydrocarbons and mixtures thereof is comprised of primarily C4 aliphatic hydrocarbons. In another embodiment, the fluid solvent consists essentially of C4 liquefied petroleum gas. In yet another embodiment, the fluid solvent comprises n-butane, butane isomers, or mixtures thereof. In still another embodiment, the fluid solvent comprises n-pentane, pentane isomers, or mixtures thereof.

In one embodiment, the temperature in the contacting, dissolving, settling and filtering steps is from about 110° C. to about 220° C. In another embodiment, the pressure in the contacting step is from about 400 psig (2.76 MPa) to about 2,400 psig (16.55 MPa). In yet another embodiment, the pressure in the contacting step is less than about 1,100 psig (7.58 MPa).

In another embodiment, the pressure in the dissolving, settling, and filtering steps is from about 400 psig (2.76 MPa) to about 6,000 (41.37 MPa). In yet another embodiment, the filtering is conducted in an axial flow direction. In still another embodiment, the filtering is conducted in a radial flow direction. In one embodiment, the filtering is conducted in a candle-type filter apparatus. In another embodiment, the candle filter apparatus is pre-coated with a filtration aid. In yet another embodiment, the candle filter apparatus is pre-coated with a filtration aid selected from the group consisting of diatomaceous earth, perlite, cellulosic fiber, clay, activated carbon, alumina, silica, alumina silicate, zeolite, and mixtures thereof. In still another embodiment, the candle filter apparatus is pre-coated with a filtration aid having a particle size from about 10 μm to about 100 μm. In one embodiment, the filtering comprises body feeding one or more filtration aids. In another embodiment, the one or more filtration aids is selected from the group consisting of diatomaceous earth, perlite, cellulosic fiber, clay, activated carbon, alumina, silica, alumina silicate, zeolite, and mixtures thereof.

In one embodiment, the solid media is selected from the group consisting of inorganic substances. In another embodiment, the one or more solid media is selected from the group consisting of oxides of silicon, oxides of aluminum, oxides of iron, aluminum silicates, amorphous volcanic glasses, and mixtures thereof. In yet another embodiment, the one or more solid media is selected from the group consisting of silica gel, diatomite, sand, quartz, activated alumina, perlite, fuller's earth, bentonite, and mixtures thereof. In still another embodiment, the contacting of the third solution with one or more solid media is performed in a packed bed of one or more solid media.

DETAILED DESCRIPTION OF THE INVENTION

I. Definitions

Figure 1:
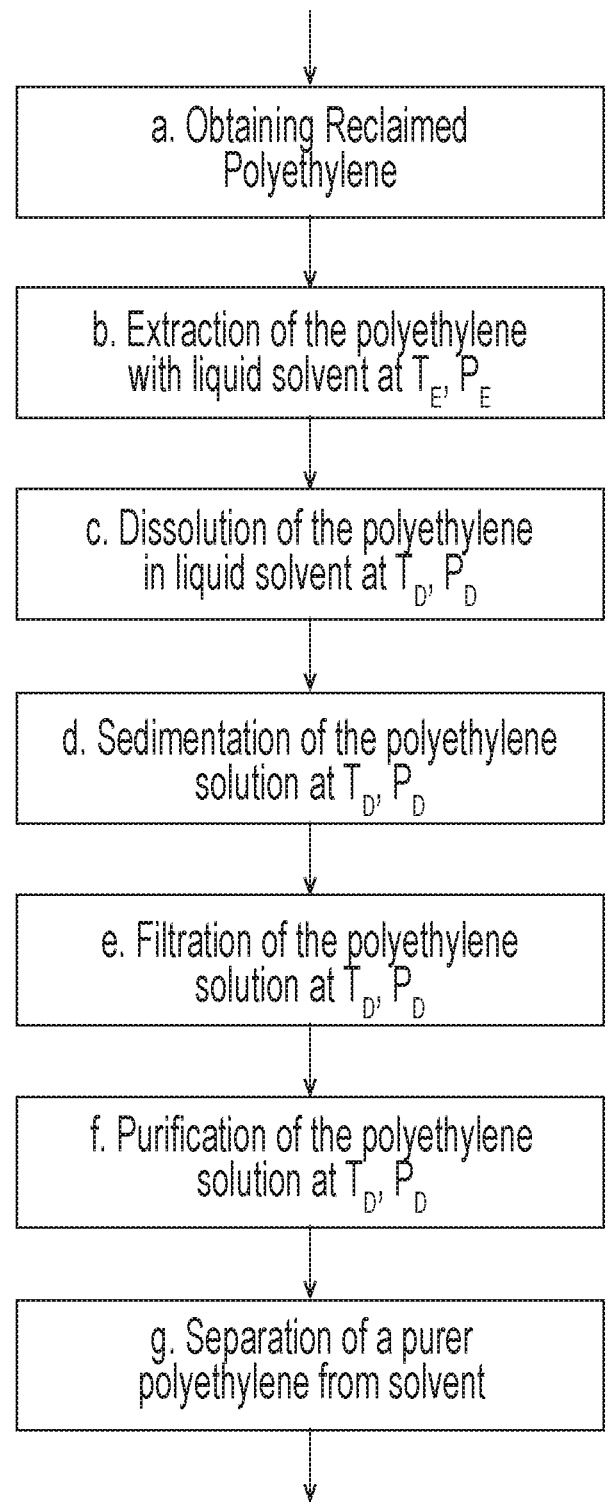
FIG. 1 is a block flow diagram showing the major steps of one embodiment of the present invention.
Figure 2A:
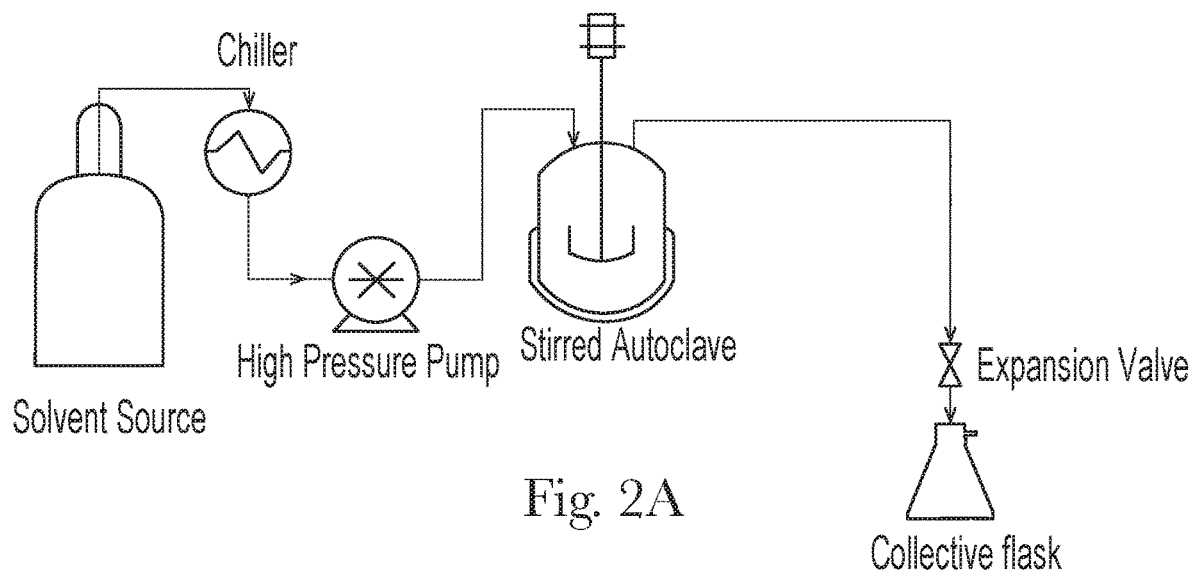
FIG. 2A is a schematic of the experimental apparatus used for extraction.
Figure 2B:
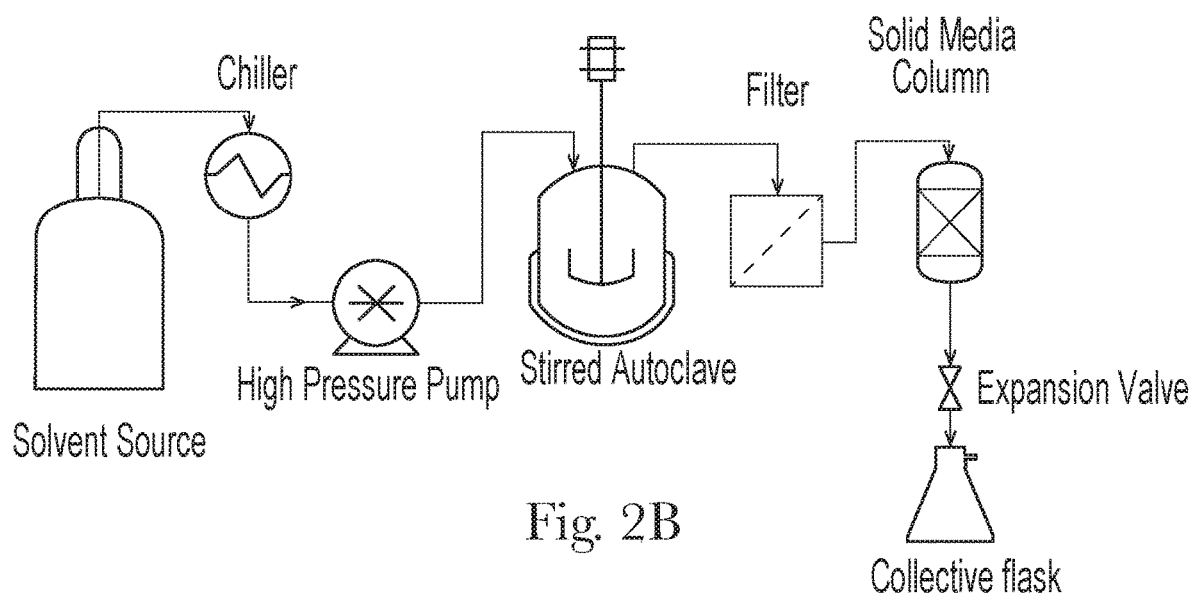
FIG. 2B is a schematic of the experimental apparatus used for dissolution, sedimentation, filtration, and purification.

As used herein, the term "reclaimed polymer" refers to a polymer used for a previous purpose and then recovered for further processing.

As used herein, the term "reclaimed polyethylene" refers to a polyethylene polymer used for a previous purpose and then recovered for further processing.

As used herein, the term "post-consumer" refers to a source of material that originates after the end consumer has used the material in a consumer good or product.

As used herein, the term "post-consumer recycle" (PCR) refers to a material that is produced after the end consumer has used the material and has disposed of the material in a waste stream.

As used herein, the term "post-industrial" refers to a source of a material that originates during the manufacture of a good or product.

As used herein, the term "fluid solvent" refers to a substance that may exist in the liquid state under specified conditions of temperature and pressure. In some embodiments the fluid solvent may be a predominantly homogenous chemical composition of one molecule or isomer, while in other embodiments, the fluid solvent may be a mixture of several different molecular compositions or isomers. Further, in some embodiments of the present invention, the term "fluid solvent" may also apply to substances that are at, near, or above the critical temperature and critical pressure (critical point) of that substance. It is well known to those having ordinary skill in the art that substances above the critical point of that substance are known as "supercritical fluids" which do not have the typical physical properties (i.e. density) of a liquid.

As used herein, the term "dissolved" means at least partial incorporation of a solute (polymeric or non-polymeric) in a solvent at the molecular level. Further, the thermodynamic stability of the solute/solvent solution can be described by the following equation 1:

$$\Delta G_{mix} = \Delta H_m - T \Delta S_{mix} \qquad \text{Equation 1}$$

where $\Delta G_{mix}$ is the Gibbs free energy change of mixing of a solute with a solvent, $\Delta H_{mix}$ is the enthalpy change of mixing, T is the absolute temperature, and $\Delta S_{mix}$ is the entropy of mixing. To maintain a stable solution of a solute in a solvent, the Gibbs free energy must be negative and at a minimum. Thus, any combination of solute and solvent that minimize a negative Gibbs free energy at appropriate temperatures and pressures can be used for the present invention.

As used herein, the term "standard boiling point" refers to the boiling temperature at an absolute pressure of exactly 100 kPa (1 bar, 14.5 psia, 0.9869 atm) as established by the International Union of Pure and Applied Chemistry (IUPAC).

As used herein, the term "standard enthalpy change of vaporization" refers to the enthalpy change required to transform a specified quantity of a substance from a liquid into a vapor at the standard boiling point of the substance.

As used herein, the term "polyethylene solution" refers to a solution of polyethylene dissolved in a solvent. The polyethylene solution may contain undissolved matter and thus the polyethylene solution may also be a "slurry" of undissolved matter suspended in a solution of polyethylene dissolved in a solvent.

As used herein, the terms "sedimentation" and "settling" refer to the tendency of particles within a suspension to separate from a liquid in response to a force (typically a gravitational force) acting upon the particles.

As used herein, the term "suspended contaminant" refers to unwanted or undesired constituent present throughout the bulk of medium of a heterogeneous mixture.

As used herein, the term "dissolved contaminant" refers to an unwanted or undesired constituent at least partially incorporated into a solvent at the molecular level.

As used herein, the term "filtration" and "filtering" refers to a separation of at least one dissolved and/or suspended contaminant from a fluid by using mechanical and/or physical operations (e.g. passing the contaminated fluid through a filtration system). As used herein, the terms "filtration system" and "filter" are used interchangeably.

As used herein, when referring to a solution, the term "less suspended contaminant" refers to a subsequent condition of the solution, with respect to a prior condition (e.g. prior to a contaminant removal step), in which the prior solution had a relatively greater quantity of the suspended contaminant.

As used herein, when referring to a solution, the term "comprising even less of a suspended contaminant" refers to a subsequent condition of the solution, with respect to a prior condition (e.g. "comprising less of a suspended contaminant"), in which the prior solution had a relatively greater quantity of the suspended contaminant.

As used herein, the terms "solid media" and "solid medium" refer to a substance that exists in the solid state under the conditions of use. The solid media may be crystalline, semi-crystalline, or amorphous. The solid media may be granular and may be supplied in different shapes (i.e. spheres, cylinders, pellets, etc.). If the solid media are granular, the particle size and particle size distribution of solid media may be defined by the mesh size used to classify the granular media. An example of standard mesh size designations can be found in the American Society for Testing and Material (ASTM) standard ASTM E11 "Standard Specification for Woven Wire Test Sieve Cloth and Test Sieves." The solid media may also be a non-woven fibrous mat or a woven textile.

As used herein, the term "purer polyethylene solution" refers to a polyethylene solution having less of one or more contaminants relative to the same polyethylene solution prior to a purification step.

As used herein, the term "extraction" refers to the practice of transferring a solute species from a liquid phase (or solid matrix) across a phase boundary to a separate immiscible liquid phase. The driving force(s) for extraction are described by partition theory.

As used herein, the term "extracted" refers to a material having less of one or more solute species relative to the same material prior to an extraction step. As used herein, the term "extracted reclaimed polyethylene" refers to a reclaimed polyethylene having less of one or more solute species relative to the same reclaimed polyethylene prior to an extraction step.

As used herein, the term "virgin-like" means essentially contaminant-free, pigment-free, odor-free, homogenous, and similar in properties to virgin polymers.

As used herein, the term "primarily polyethylene copolymer" refers a copolymer with greater than 70 mol % of ethylene repeating units.

As used herein, any reference to international units of pressure (e.g. MPa) refers to gauge pressure.

As used herein, the term "axial flow direction" refers to a fluid flowing parallel to the long axis of a filter medium.

As used herein, the term "radial flow direction" refers to a fluid flowing perpendicular to the long axis of a filter medium.

As used herein, the terms "candle-type filter apparatus" and "candle filter," more generally referred to as an "external-cake tubular filter," refer to an apparatus that uses pressure to separate solids from a liquid. A detailed description of candle-type filters, as well as other solid-liquid separation apparatuses, is provided in the following reference: Perry, Robert H, and Don W. Green. Perry's Chemical Engineers' Handbook. New York: McGraw-Hill, 2008. Print.

As used herein, the term "pre-coated with filtration aid" refers to a solid-liquid separation apparatus where the filtration medium is comprised of a rigid or semi-rigid screen on which a layer or layers of fine solid material (e.g. diatomaceous earth, perlite, cellulosic fiber, clay, activated carbon, alumina, silica, alumina silicate, zeolite, and mixtures thereof) are deposited.

As used herein, the term "body feeding" or "body fed" refers to the addition of filtration aid to a fluid before the fluid is filtered.

II. Method for Purifying Contaminated Polyethylene

Surprisingly, it has been found that contaminated high molecular weight polymer solutions are purified by filtration. This process, exemplified in FIG. 1, comprises 1) obtaining a reclaimed polyethylene (step a in FIG. 1), followed by 2) extracting the polyethylene with a fluid solvent at an extraction temperature ($T_E$) and at an extraction pressure ($P_E$) (step b in FIG. 1), followed by 3) dissolving the polyethylene in a fluid solvent at a dissolution temperature ($T_D$) and at a dissolution pressure ($P_D$) (step c in FIG. 1), followed by 4) settling the polymer solution at a dissolution temperature ($T_D$) and at a dissolution pressure ($P_D$) (step d in FIG. 1), followed by 5) filtering the polymer solution dissolution temperature ($T_D$) and at a dissolution pressure ($P_D$) (step e in FIG. 1), followed by 6) purifying the polyethylene solution with solid media at a dissolution temperature ($T_D$) and at a dissolution pressure ($P_D$) (step f in FIG. 1), followed by separation of the polyethylene from the fluid solvent (step g in FIG. 1). Note that the aforementioned terms $T_E$, $P_E$, $T_D$, $P_D$ may vary in value from one step to another.

In one embodiment of the present invention, the purified polyethylene, which may be sourced from post-consumer waste streams, is essentially contaminant-free, pigment-free, odor-free, homogenous, and similar in properties to virgin polymers.

Reclaimed Polyethylene

In one embodiment of the present invention, a method for purifying reclaimed polyethylene includes obtaining reclaimed polyethylene. For the purposes of the present invention, the reclaimed polyethylene is sourced from post-consumer, post-industrial, post-commercial, and/or other special waste streams. For example, post-consumer waste polyethylene can be derived from curbside recycle streams where end-consumers place used polymers from packages and products into a designated bin for collection by a waste hauler or recycler. Post-consumer waste polymers can also be derived from in-store "take-back" programs where the consumer brings waste polymers into a store and places the waste polymers in a designated collection bin. An example of post-industrial waste polymers can be waste polymers produced during the manufacture or shipment of a good or product that are collected as unusable material by the manufacturer (i.e. trim scraps, out of specification material, start up scrap). An example of waste polymers from a special waste stream can be waste polymers derived from the recycling of electronic waste, also known as "e-waste." Another example of waste polymers from a special waste stream can be waste polymers derived from the recycling of automobiles. Another example of waste polymers from a special waste stream can be waste polymers derived from the recycling of used carpeting and textiles.

For the purposes of the present invention, the reclaimed polyethylene is a homogenous composition of an individual polymer or a mixture of several different polyethylene compositions. Non-limiting examples of polyethylene compositions are homopolymers and copolymers of ethylene, such as high density polyethylene (HDPE), low density polyethylene (LDPE), linear low density polyethylene (LLDPE), copolymers of ethylene and alpha-olefins, and other dissolvable polyethylene polymers that may be apparent to those having ordinary skill in the art.

The reclaimed polyethylene may also contain various pigments, dyes, process aides, stabilizing additives, fillers, and other performance additives that were added to the polymer during polymerization or conversion of the original polymer to the final form of an article. Non-limiting examples of pigments are organic pigments, such as copper phthalocyanine, inorganic pigments, such as titanium dioxide, and other pigments that may be apparent to those having ordinary skill in the art. A non-limiting example of an organic dye is Basic Yellow 51. Non-limiting examples of process aides are antistatic agents, such as glycerol monostearate and slip-promoting agents, such as erucamide. A non-limiting example of a stabilizing additive is octadecyl-3-(3,5-di-tert.butyl-4-hydroxyphenyl)-propionate. Non-limiting examples of fillers are calcium carbonate, talc, and glass fibers.

Solvent

The fluid solvent of the present invention has a standard boiling point less than about 70° C. Pressurization maintains solvents, which have standard boiling points below the operating temperature range of the present invention, in a state in which there is little or no solvent vapor. In one embodiment, the fluid solvent with a standard boiling point less than about 70° C. is selected from the group consisting of carbon dioxide, ketones, alcohols, ethers, esters, alkenes, alkanes, and mixtures thereof. Non-limiting examples of fluid solvents with standard boing points less than about 70° C. are carbon dioxide, acetone, methanol, dimethyl ether, diethyl ether, ethyl methyl ether, tetrahydrofuran, methyl acetate, ethylene, propylene, 1-butene, 2-butene, isobutylene, 1-pentene, 2-pentene, branched isomers of pentene, 1-hexene, 2-hexene, methane, ethane, propane, n-butane, isobutane, n-pentane, isopentane, neopentane, n-hexane, isomers of isohexane, and other substances that may be apparent to those having ordinary skill in the art.

The selection of the fluid solvent used will dictate the temperature and pressure ranges used to perform the steps of the present invention. A review of polymer phase behavior in solvents of the kind described by the present invention is provided in the following reference: McHugh et al. (1999) Chem. Rev. 99:565-602.

Extraction

In one embodiment of the present invention, a method for purifying polyethylene includes contacting reclaimed polyethylene with a fluid solvent at a temperature and at a pressure wherein the polymer is essentially insoluble in the fluid solvent. Although not wishing to be bound by any theory, applicants believe that the temperature and pressure-dependent solubility can be controlled in such a way to prevent the fluid solvent from fully solubilizing the polymer, however, the fluid solvent can diffuse into the polymer and extract any extractable contamination. The extractable contamination may be residual processing aides added to the polymer, residual product formulations which contacted the polymer, such as perfumes and flavors, dyes, and any other extractable material that may have been intentionally added or unintentionally became incorporated into the polymer, for example, during waste collection and subsequent accumulation with other waste materials.

In one embodiment, the controlled extraction may be accomplished by fixing the temperature of the polymer/fluid solvent system and then controlling the pressure below a pressure, or pressure range, where the polymer dissolves in the fluid solvent. In another embodiment, the controlled extraction is accomplished by fixing the pressure of the polymer/solvent system and then controlling the temperature above a temperature, or temperature range where the polymer dissolves in the fluid solvent. The temperature and pressure controlled extraction of the polymer with a fluid solvent uses a suitable pressure vessel and may be configured in a way that allows for continuous extraction of the polymer with the fluid solvent. In one embodiment of the present invention, the pressure vessel may be a continuous liquid-liquid extraction column where molten polymer is pumped into one end of the extraction column and the fluid solvent is pumped into the same or the opposite end of the extraction column. In another embodiment, the fluid containing extracted contamination is removed from the process. In another embodiment, the fluid containing extracted contamination is purified, recovered, and recycled for use in the extraction step or a different step in the process. In one embodiment of the present invention, the extraction may be performed as a batch method, wherein the reclaimed polyethylene is fixed in a pressure vessel and the fluid solvent is continuously pumped through the fixed polymer phase. The extraction time or the amount of fluid solvent used will depend on the desired purity of the final purer polymer and the amount of extractable contamination in the starting reclaimed polyethylene. In another embodiment, the fluid containing extracted contamination is contacted with solid media in a separate step as described in the "Purification" section below. In another embodiment, a method for purifying reclaimed polyethylene includes contacting reclaimed polyethylene with a fluid solvent at a temperature and at a pressure wherein the polymer is molten and in the liquid state. In another embodiment, the reclaimed polyethylene is contacted with the fluid solvent at a temperature and at a pressure wherein the polymer is in the solid state.

In one embodiment, a method for purifying reclaimed polyethylene includes contacting polyethylene with a fluid solvent at a temperature and a pressure wherein the polyethylene remains essentially undissolved. In another embodiment, a method for purifying reclaimed polyethylene includes contacting polyethylene with a fluid solvent at a temperature from about 80° C. to about 280° C. In yet another embodiment, a method for purifying reclaimed polyethylene includes contacting polyethylene with a fluid solvent at a temperature from about 110° C. to about 220° C. In one embodiment, a method for purifying reclaimed polyethylene includes contacting polyethylene with a fluid solvent at a pressure from about 150 psig (1.03 MPa) to about 8,000 psig (55.16 MPa). In another embodiment, a method for purifying reclaimed polyethylene includes contacting polyethylene with a fluid solvent at a pressure from about 400 psig (2.76 MPa) to about 2,400 psig (16.55 MPa).

In another embodiment, a method for purifying reclaimed polyethylene includes contacting polyethylene with n-butane at a temperature from about 80° C. to about 280° C. In another embodiment, a method for purifying reclaimed polyethylene includes contacting polyethylene with n-butane at a temperature from about 100° C. to about 220° C. In another embodiment, a method for purifying reclaimed polyethylene includes contacting polyethylene with n-butane at a temperature from about 130° C. to about 180° C. In another embodiment, a method for purifying reclaimed polyethylene includes contacting polyethylene with n-butane at a pressure from about 400 psig (2.78 MPa) to about 6,000 psig (34.47 MPa). In another embodiment, a method for purifying reclaimed polyethylene includes contacting polyethylene with n-butane at a pressure from about 800 psig (5.51 MPa) to about 5,000 psig (34.47 MPa). In another embodiment, a method for purifying reclaimed polyethylene includes contacting polyethylene with n-butane at a pressure from about 1,000 psig (6.81 MPa) to about 4,500 psig (31.03 MPa).

In another embodiment, a method for purifying reclaimed polyethylene includes contacting polyethylene with n-pentane at a temperature from about 80° C. to about 280° C. In another embodiment, a method for purifying reclaimed polyethylene includes contacting polyethylene with n-pentane at a temperature from about 100° C. to about 220° C. In another embodiment, a method for purifying reclaimed polyethylene includes contacting polyethylene with n-pentane at a temperature from about 130° C. to about 180° C. In another embodiment, a method for purifying reclaimed polyethylene includes contacting polyethylene with n-pentane at a pressure from about 400 psig (2.78 MPa) to about 3,000 psig (20.68 MPa). In another embodiment, a method for purifying reclaimed polyethylene includes contacting polyethylene with n-pentane at a pressure from about 800 psig (5.52 MPa) to about 2,800 psig (19.31 MPa). In another embodiment, a method for purifying reclaimed polyethylene includes contacting polyethylene with n-pentane at a pressure from about 1,000 psig (6.89 MPa) to about 2,400 psig (16.55 MPa).

Dissolution

In one embodiment of the present invention, a method for purifying reclaimed polyethylene includes dissolving the reclaimed polyethylene in a fluid solvent at a temperature and at a pressure wherein the polymer is dissolved in the fluid solvent. Although not wishing to be bound by any theory, applicants believe that the temperature and pressure can be controlled in such a way to enable thermodynamically favorable dissolution of the reclaimed polymer in a fluid solvent. Furthermore, the temperature and pressure can be controlled in such a way to enable dissolution of a particular polymer or polymer mixture while not dissolving other polymers or polymer mixtures. This controllable dissolution enables the separation of polymers from polymer mixtures.

In one embodiment of the present invention, a method for purifying polymers includes dissolving contaminated reclaimed polyethylene in a solvent that does not dissolve the contaminants under the same conditions of temperature and pressure. The contaminants may include pigments, fillers, dirt, and other polymers. These contaminants are released from the reclaimed polyethylene upon dissolution and then removed from the polymer solution via a subsequent solid-liquid separation step. In another embodiment, a method for purifying reclaimed polyethylene includes dissolving polyethylene in a fluid solvent at a temperature from about 90° C. to about 280° C. In yet another embodiment, a method for purifying reclaimed polyethylene includes dissolving polyethylene in a fluid solvent at a temperature from about 110° C. to about 220° C. In one embodiment, a method for purifying reclaimed polyethylene includes dissolving polyethylene in a fluid solvent at a pressure from about 200 psig (1.38 MPa) to about 8,000 psig (55.16 MPa). In another embodiment, a method for purifying reclaimed polyethylene includes dissolving polyethylene in a fluid solvent at a pressure from about 400 psig (2.76 MPa) to about 2,600 psig (17.93 MPa).

In one embodiment of the present invention, a method for purifying reclaimed polyethylene includes dissolving polyethylene in a fluid solvent at a temperature and at a pressure wherein the polyethylene is dissolved in the fluid solvent. In another embodiment, a method for purifying reclaimed polyethylene includes dissolving polyethylene in n-butane at a temperature from about 90° C. to about 280° C. In another embodiment, a method for purifying reclaimed polyethylene includes dissolving polyethylene in n-butane at a temperature from about 100° C. to about 220° C. In another embodiment, a method for purifying reclaimed polyethylene includes dissolving polyethylene in n-butane at a temperature from about 130° C. to about 180° C. In another embodiment, a method for purifying reclaimed polyethylene includes dissolving polyethylene in n-butane at a pressure from about 4,000 psig (27.58 MPa) to about 8,000 psig (55.16 MPa). In another embodiment, a method for purifying reclaimed polyethylene includes dissolving polyethylene in n-butane at a pressure from about 4,200 psig (28.96 MPa) to about 7,000 psig (48.26 MPa). In another embodiment, a method for purifying reclaimed polyethylene includes dissolving polyethylene in n-butane at a pressure from about 4,500 psig (31.03 MPa) to about 6,000 psig (41.37 MPa). In another embodiment, a method for purifying reclaimed polyethylene includes dissolving polyethylene in n-butane at a mass percent concentration of at least 0.5%. In another embodiment, the polyethylene is dissolved at a mass percent concentration of at least 1%. In another embodiment, the polyethylene is dissolved at a mass percent concentration of at least 2%. In another embodiment, the polyethylene is dissolved at a mass percent concentration of at least 3%. In another embodiment, the polyethylene is dissolved at a mass percent concentration of at least 4%. In another embodiment, the polyethylene is dissolved at a mass percent concentration of at least 5%. In another embodiment, a method for purifying reclaimed polyethylene includes dissolving polyethylene in n-butane at a mass percent concentration up to 20%. In another embodiment, the polyethylene is dissolved at a mass percent concentration up to 18%. In another embodiment, the polyethylene is dissolved at a mass percent concentration up to 16%. In another embodiment, the polyethylene is dissolved at a mass percent concentration up to 14%. In another embodiment, the polyethylene is dissolved at a mass percent concentration up to 12%.

In another embodiment, a method for purifying reclaimed polyethylene includes dissolving polyethylene in n-pentane at a temperature from about 90° C. to about 280° C. In another embodiment, a method for purifying reclaimed polyethylene includes dissolving polyethylene in n-pentane at a temperature from about 100° C. to about 220° C. In another embodiment, a method for purifying reclaimed polyethylene includes dissolving polyethylene in n-pentane at a temperature from about 130° C. to about 180° C. In another embodiment, a method for purifying reclaimed polyethylene includes dissolving polyethylene in n-pentane at a pressure from about 800 psig (5.52 MPa) to about 4,000 psig (27.58 MPa). In another embodiment, a method for purifying reclaimed polyethylene includes dissolving polyethylene in n-pentane at a pressure from about 900 psig (6.21 MPa) to about 3,000 psig (20.68 MPa). In another embodiment, a method for purifying reclaimed polyethylene includes dissolving polyethylene in n-pentane at a pressure from about 1,000 psig (6.89 MPa) to about 2,400 psig (16.55 MPa). In another embodiment, a method for purifying reclaimed polyethylene includes dissolving polyethylene in n-pentane at a mass percent concentration of at least 0.5%. In another embodiment, the polyethylene is dissolved at a mass percent concentration of at least 1%. In another embodiment, the polyethylene is dissolved at a mass percent concentration of at least 2%. In another embodiment, the polyethylene is dissolved at a mass percent concentration of at least 3%. In another embodiment, the polyethylene is dissolved at a mass percent concentration of at least 4%. In another embodiment, the polyethylene is dissolved at a mass percent concentration of at least 5%. In another embodiment, a method for purifying reclaimed polyethylene includes dissolving polyethylene in n-pentane at a mass percent concentration up to 20%. In another embodiment, the polyethylene is dissolved at a mass percent concentration up to 18%. In another embodiment, the polyethylene is dissolved at a mass percent concentration up to 16%. In another embodiment, the polyethylene is dissolved at a mass percent concentration up to 14%. In another embodiment, the polyethylene is dissolved at a mass percent concentration up to 12%.

Sedimentation

In one embodiment of the present invention, a method for purifying polyethylene includes separating the undissolved contaminants from the polyethylene solution via a sedimentation (also known as settling) step at a temperature and at a pressure wherein the polymer remains dissolved in the fluid solvent. In one embodiment, the settling step causes the undissolved contaminants to experience a force that uniformly moves the undissolved contaminants in the direction of the force. Typically the applied settling force is gravity, but can also be a centrifugal, centripetal, or some other force. The amount of applied force and duration of settling time will depend upon several parameters, including, but not limited to: particle size of the contaminant particles, contaminant particle densities, density of the fluid or solution, and the viscosity of the fluid or solution. The following equation (equation 2) is a relationship between the aforementioned parameters and the settling velocity, which is a measure of the contaminant sedimentation rate:

$$v = \frac{2(\rho_p - \rho_f)gr^2}{9\eta}$$ Equation 2 where v is the settling velocity, $\rho_p$ is the density of the contaminant particle, $\rho_f$ is the density of the fluid or solution, g is the acceleration due to the applied force (typically gravity), r is the radius of the contaminant particle and $\eta$ is the dynamic viscosity of the fluid or solution. Some of the key parameters that determine the solution viscosity are: the chemical composition of the fluid solvent, the molecular weight of the polymer dissolved in the fluid solvent, the concentration of dissolved polymer in the fluid solvent, the temperature of the fluid solvent solution, and the pressure of the fluid solvent solution.

In one embodiment, a method for purifying reclaimed polyethylene includes settling contaminants from a polyethylene/fluid solvent solution at a temperature and at a pressure wherein the polyethylene remains dissolved in the fluid solvent. In another embodiment, a method for purifying reclaimed polyethylene includes settling contaminants from a polyethylene/fluid solvent solution at a temperature from about 90° C. to about 280° C. In yet another embodiment, a method for purifying reclaimed polyethylene includes settling contaminants from a polyethylene/fluid solvent solution at a temperature from about 110° C. to about 220° C. In one embodiment, a method for purifying reclaimed polyethylene includes settling contaminants from a polyethylene/fluid solvent solution at a pressure from about 200 psig (1.38 MPa) to about 8,000 psig (55.16 MPa). In another embodiment, a method for purifying reclaimed polyethylene includes settling contaminants from a polyethylene/fluid solvent solution at a pressure from about 400 psig (2.76 MPa) to about 2,600 psig (17.93 MPa).

In another embodiment, a method for purifying reclaimed polyethylene includes settling contaminants from a polyethylene/n-butane solution at a temperature from about 90° C. to about 280° C. In another embodiment, a method for purifying reclaimed polyethylene includes settling contaminants from a polyethylene/n-butane solution at a temperature from about 100° C. to about 220° C. In another embodiment, a method for purifying reclaimed polyethylene includes settling contaminants from a polyethylene/n-butane solution at a temperature from about 130° C. to about 180° C. In another embodiment, a method for purifying reclaimed polyethylene includes settling contaminants from a polyethylene/n-butane solution at a pressure from about 4,000 psig (27.58 MPa) to about 8,000 psig (55.16 MPa). In another embodiment, a method for purifying reclaimed polyethylene includes settling contaminants from a polyethylene/n-butane solution at a pressure about 4,200 psig (28.96 MPa) to about 7,000 psig (48.26 MPa). In another embodiment, a method for purifying reclaimed polyethylene includes settling contaminants from a polyethylene/n-butane solution at a pressure from about 4,500 psig (31.03 MPa) to about 6,000 psig (41.37 MPa). In another embodiment, a method for purifying reclaimed polyethylene includes settling contaminants from a polyethylene/n-butane solution wherein the polyethylene is dissolved at a mass percent concentration of at least 0.5%. In another embodiment, the polyethylene is dissolved at a mass percent concentration of at least 1%. In another embodiment, the polyethylene is dissolved at a mass percent concentration of at least 2%. In another embodiment, the polyethylene is dissolved at a mass percent concentration of at least 3%. In another embodiment, the polyethylene is dissolved at a mass percent concentration of at least 4%. In another embodiment, the polyethylene is dissolved at a mass percent concentration of at least 5%. In another embodiment, a method for purifying reclaimed polyethylene includes settling contaminants from a polyethylene/n-butane solution where in the polyethylene is dissolved at a mass percent concentration up to 20%. In another embodiment, the polyethylene is dissolved at a mass percent concentration up to 18%. In another embodiment, the polyethylene is dissolved at a mass percent concentration up to 16%. In another embodiment, the polyethylene is dissolved at a mass percent concentration up to 14%. In another embodiment, the polyethylene is dissolved at a mass percent concentration up to 12%.

In another embodiment, a method for purifying reclaimed polyethylene includes settling contaminants from a polyethylene/n-pentane solution at a temperature from about 90° C. to about 280° C. In another embodiment, a method for purifying reclaimed polyethylene includes settling contaminants from a polyethylene/n-pentane solution at a temperature from about 100° C. to about 220° C. In another embodiment, a method for purifying reclaimed polyethylene includes settling contaminants from a polyethylene/n-pentane solution at a temperature from about 130° C. to about 180° C. In another embodiment, a method for purifying reclaimed polyethylene includes settling contaminants from a polyethylene/n-pentane solution at a pressure from about 800 psig (5.52 MPa) to about 3,000 psig (20.68 MPa). In another embodiment, a method for purifying reclaimed polyethylene includes settling contaminants from a polyethylene/n-pentane solution at a pressure from about 900 psig (6.21 MPa) to about 3,000 psig (20.68 MPa). In another embodiment, a method for purifying reclaimed polyethylene includes settling contaminants from a polyethylene/n-pentane solution at a pressure from about 1,000 psig (6.89 MPa) to about 2,400 psig (16.55 MPa). In another embodiment, a method for purifying reclaimed polyethylene includes settling contaminants from a polyethylene/n-pentane solution wherein the polyethylene is dissolved at a mass percent concentration of at least 0.5%. In another embodiment, the polyethylene is dissolved at a mass percent concentration of at least 1%. In another embodiment, the polyethylene is dissolved at a mass percent concentration of at least 2%. In another embodiment, the polyethylene is dissolved at a mass percent concentration of at least 3%. In another embodiment, the polyethylene is dissolved at a mass percent concentration of at least 4%. In another embodiment, the polyethylene is dissolved at a mass percent concentration of at least 5%. In another embodiment, a method for purifying reclaimed polyethylene includes settling contaminants from a polyethylene/n-pentane solution where in the polyethylene is dissolved at a mass percent concentration up to 20%. In another embodiment, the polyethylene is dissolved at a mass percent concentration up to 18%. In another embodiment, the polyethylene is dissolved at a mass percent concentration up to 16%. In another embodiment, the polyethylene is dissolved at a mass percent concentration up to 14%. In another embodiment, the polyethylene is dissolved at a mass percent concentration up to 12%.

Filtration

A typical filtration system comprises a filter medium, a filter container, a filter inlet, and a filter outlet. The filter medium comprises filter particles that are contained within the filter container. The filter inlet is in fluid communication with the filter container and carries the filtration feed stream in the filter container, and the filter outlet is in fluid communication with the filtration system and carries the filtrate stream out of the filter container. A filtration system can comprise one or more filter media, filter containers, and filter inlets and outlets in series or in parallel. Also, a filtration system can operate in radial or axial flow, or it can operate in upflow, downflow, or crossflow. A non-limiting example of a radial flow filter is a candle filter. Furthermore, the filtration can be of surface or depth filtration type, and is based on mechanical mode of cation.

The filter medium used in depth filtration comprises an aggregate of filter particles, which can be either homogeneous or heterogeneous. The filter particles can be uniformly or non-uniformly distributed (e.g., layers of different filter particles) within the filter medium. The filter particles forming the filter medium also need not be identical in shape or size and may be provided in either a loose or interconnected form. For example, a filter medium might comprise filter particles which can be either in loose association, or partially or wholly bonded by a polymeric binder or other means to form an integral structure.

Also, the filter particles can be provided in a variety of shapes and sizes. For example, and not by way of limitation, the filter particles can be provided in simple forms, such as powder, granules, fibers, and beads. The filter particles can be provided in the shape of a sphere, polyhedron, cylinder, as well as other symmetrical, asymmetrical, and irregular shapes. Further, the filter particles can also be formed into complex forms such as webs, screens, meshes, non-wovens, wovens, and bonded blocks, which may or may not be formed from the simple forms described above.

The filter particles can vary in size, from impalpable filter particles (e.g., a very fine powder) to palpable filter particles. Furthermore, the size of the filter particles need not be uniform among the filter particles which are used in any single filtration system. In fact, it can be desirable to provide filter particles having different sizes in a single filter. In one embodiment of the present invention, the size of the filter particles varies between about 0.1 mm and about 10 mm. In another embodiment of the present invention, the size of the filter particles varies between about 10 mm and about 8 mm. In yet another embodiment of the present invention, the size of the filter particles varies between about 100 mm and about 5 mm. In even yet another embodiment of the present invention, the size of the filter particles varies between about 1 mm and about 4 mm. In one embodiment of the present invention, the size of the filter particles varies between about 10 µm and about 100 µm. For spherical and cylindrical particles (e.g., fibers, beads, etc.), the above-described dimensions refer to the diameter of the filter particles. For filter particles having substantially different shapes, the above-described dimensions refer to the largest dimension (e.g. length, width, or height).

A non-limiting example of a mechanical mode of action is size exclusion, where a suspended (dispersed) contaminant gets retained by the filtration medium, and thus separated from the filtration feed stream, because the suspended contaminant's size is larger than the pores of the filtration medium. As described, size exclusion is an inter-particle phenomenon.

Non-limiting examples of filter particles are silicon oxide (silica), silica gel, aluminum oxide (alumina), activated alumina, iron oxide, aluminum silicate, magnesium silicate, amorphous volcanic glass, reclaimed glass, sand, quartz, diatomaceous earth, zeolite, molecular sieve, perlite, clay, fuller's earth, bentonite clay, metal organic framework (MOF), covalent organic framework (COF), zeolitic imidazolate framework (ZIF), cellulose, lignocellulose, anthracite coal, carbon black, coke, and activated carbon. In one embodiment of the present invention, the filter particles are selected from the group consisting of silica, activated alumina, silica gel, volcanic glass, fuller's earth, bentonite clay, and mixtures thereof. In another embodiment of the present invention, the filter particles are selected from the group consisting of activated carbon, activated alumina, diatomaceous earth, and mixtures thereof. In yet another embodiment of the present invention, the filter particles are selected from the group consisting of MOF, COF, ZIF, activated carbon, activated alumina, and mixtures thereof. In even yet another embodiment of the present invention, the filter particles are selected from the group consisting of diatomaceous earth, activated alumina, and mixtures thereof.

Non-limiting examples of filter media used in surface filtration are a thin layer of filter particles, porous ceramics, filter paper, filter cloths, plastic membrane, screen, non-woven, woven, porous frit/sintered metal, and perforated plate. In a typical surface filtration, the retained contaminants form a cake on top of the filter medium that increases in thickness as the filtration proceeds. Typically, after a certain filtration time, the filter cake needs to be removed, as it offers unsustainable pressure drop, either by mechanical action or back-flushing. In one embodiment of the present invention, the filter medium used in surface filtration is selected from the group consisting of a thin layer of diatomaceous earth particles deposited onto a woven metal porous core (typically called sock). The porous core supports the filter medium and allows the filtration feed stream to flow through. Non-limiting examples of cores are perforated tubes and screen sleeves.

Filter aids may be used in filtration. Non-limiting examples of filter aids are diatomaceous earth (also called kieselguhr), cellulose, and perlite. These filter aids can be used either as a pre-coat to the filter media or added into the filtration feed stream. In the latter case (also called body feed), the filter aids increase the porosity of the cake formed onto the filter media thus reducing the pressure drop through the cake during filtration.

At the end of their useful life, filters can either be removed from the operation and get replaced with fresh ones, or get regenerated. Non-limiting examples of regeneration are back-flushing, thermal regeneration, and solvent regeneration.

In one embodiment of the present invention, the surface filter comprises a candle filter. In another embodiment of the present invention, the candle filter comprises a thin layer of diatomaceous earth deposited onto a woven metal porous core. In yet another embodiment of the present invention, the thickness of the diatomaceous earth layer is between about 1 mm and about 20 mm. In even yet another embodiment of the present invention, the thickness of the diatomaceous earth layer is between about 2 mm and about 10 mm. In one embodiment of the present invention, the thickness of the diatomaceous earth layer is between about 3 mm and about 5 mm.

The permeability of the filter medium is measured (as it is well known to those skilled in the art) by passing a fluid stream through the filter medium and measuring the flow rate and pressure drop. The unit of measurement is millidarcy (mD), and 1 mD is equivalent to the passage of 1 mL of fluid with 1 mPa·s (1 cP) viscosity, flowing in 1 s under a pressure of 1 atm, through a filter medium 1 cm$^2$ in cross-sectional area and 1 cm in thickness. In one embodiment of the present invention, the permeability of the diatomaceous earth medium is between about 30 mD and about 20,000 mD. In another embodiment of the present invention, the permeability of the diatomaceous earth medium is between about 400 mD and about 8,000 mD. In even another embodiment of the present invention, the permeability of the diatomaceous earth medium is between about 1,000 mD and about 4,000 mD. In even yet another embodiment of the present invention, the permeability of the diatomaceous earth medium is between about 2,300 mD and about 3,400 mD.

In another embodiment of the present invention, the diatomaceous earth medium retains suspended particles with diameter larger than about 0.3 µm. In yet another embodiment of the present invention, the diatomaceous earth medium retains suspended particles with diameter larger than about 0.8 µm. In even yet another embodiment of the present invention, the diatomaceous earth medium retains suspended particles with diameter larger than about 1 µm. In one embodiment of the present invention, the diatomaceous earth medium retains suspended particles with diameter larger than about 1.7 µm. In another embodiment of the present invention, the diatomaceous earth medium retains suspended particles with diameter larger than about 4 µm.

In one embodiment of the present invention, the candle filter comprises a thin a diatomaceous earth medium deposited on a woven metal core; wherein the thickness of the diatomaceous earth medium is between about 2 mm and about 10 mm; wherein the permeability of the diatomaceous earth medium is between about 2,300 mD and 3,400 mD; and wherein the diatomaceous earth medium retains suspended particles with diameter larger than about 1.7 µm.

In one embodiment, a method for purifying reclaimed polyethylene includes filtering contaminants from a polyethylene/fluid solvent solution at a temperature and at a pressure wherein the polyethylene remains dissolved in the fluid solvent. In another embodiment, a method for purifying reclaimed polyethylene includes filtering contaminants from a polyethylene/fluid solvent solution at a temperature from about 90° C. to about 280° C. In yet another embodiment, a method for purifying reclaimed polyethylene includes filtering contaminants from a polyethylene/fluid solvent solution at a temperature from about 110° C. to about 220° C. In one embodiment, a method for purifying reclaimed polyethylene includes filtering contaminants from a polyethylene/fluid solvent solution at a pressure from about 200 psig (1.38 MPa) to about 8,000 psig (55.16 MPa). In another embodiment, a method for purifying reclaimed polyethylene includes filtering contaminants from a polyethylene/fluid solvent solution at a pressure from about 400 psig (2.76 MPa) to about 2,600 psig (17.93 MPa).

In one embodiment, a method for purifying reclaimed polyethylene includes filtering contaminants from a polyethylene/n-butane solution at a temperature from about 90° C. to about 280° C. In another embodiment, a method for purifying reclaimed polyethylene includes filtering contaminants from a polyethylene/n-butane solution at a temperature from about 100° C. to about 220° C. In yet another embodiment, a method for purifying reclaimed polyethylene includes filtering contaminants from a polyethylene/n-butane solution at a temperature from about 130° C. to about 180° C. In one embodiment, a method for purifying reclaimed polyethylene includes filtering contaminants from a polyethylene/n-butane solution at a pressure from about 4000 psig (27.58 MPa) to about 8,000 psig (55.16 MPa). In another embodiment, a method for purifying reclaimed polyethylene includes filtering contaminants from a polyethylene/n-butane solution at a pressure from about 4,200 psig (28.96 MPa) to about 7,000 psig (48.26 MPa). In yet another embodiment, a method for purifying reclaimed polyethylene includes filtering contaminants from a polyethylene/n-butane solution at a pressure from about 4,500 psig (31.03 MPa) to about 6,000 psig (41.37 MPa). In one embodiment, a method for purifying reclaimed polyethylene includes filtering contaminants from a polyethylene/n-butane solution wherein the polyethylene is dissolved at a mass percent concentration of at least 0.5%. In another embodiment, the polyethylene is dissolved at a mass percent concentration of at least 1%. In yet another embodiment, the polyethylene is dissolved at a mass percent concentration of at least 2%. In even yet another embodiment, the polyethylene is dissolved at a mass percent concentration of at least 3%. In one embodiment, the polyethylene is dissolved at a mass percent concentration of at least 4%. In another embodiment, the polyethylene is dissolved at a mass percent concentration of at least 5%. In yet another embodiment, a method for purifying reclaimed polyethylene includes filtering contaminants from a polyethylene/n-butane solution where in the polyethylene is dissolved at a mass percent concentration up to 20%. In even yet another embodiment, the polyethylene is dissolved at a mass percent concentration up to 18%. In one embodiment, the polyethylene is dissolved at a mass percent concentration up to 16%. In another embodiment, the polyethylene is dissolved at a mass percent concentration up to 14%. In yet another embodiment, the polyethylene is dissolved at a mass percent concentration up to 12%.

In another embodiment, a method for purifying reclaimed polyethylene includes filtering contaminants from a polyethylene/n-pentane solution at a temperature from about 90° C. to about 280° C. In another embodiment, a method for purifying reclaimed polyethylene includes filtering contaminants from a polyethylene/n-pentane solution at a temperature from about 100° C. to about 220° C. In another embodiment, a method for purifying reclaimed polyethylene includes filtering contaminants from a polyethylene/n-pentane solution at a temperature from about 130° C. to about 180° C. In another embodiment, a method for purifying reclaimed polyethylene includes filtering contaminants from a polyethylene/n-pentane solution at a pressure from about 800 psig (5.52 MPa) to about 4,000 psig (27.58 MPa). In another embodiment, a method for purifying reclaimed polyethylene includes filtering contaminants from a polyethylene/n-pentane solution at a pressure from about 900 psig (6.21 MPa) to about 3,000 psig (20.68 MPa). In another embodiment, a method for purifying reclaimed polyethylene includes filtering contaminants from a polyethylene/n-pentane solution at a pressure from about 1,000 psig (6.89 MPa) to about 2,400 psig (16.55 MPa). In another embodiment, a method for purifying reclaimed polyethylene includes filtering contaminants from a polyethylene/n-pentane solution wherein the polyethylene is dissolved at a mass percent concentration of at least 0.5%. In another embodiment, the polyethylene is dissolved at a mass percent concentration of at least 1%. In another embodiment, the polyethylene is dissolved at a mass percent concentration of at least 2%. In another embodiment, the polyethylene is dissolved at a mass percent concentration of at least 3%. In another embodiment, the polyethylene is dissolved at a mass percent concentration of at least 4%. In another embodiment, the polyethylene is dissolved at a mass percent concentration of at least 5%. In another embodiment, a method for purifying reclaimed polyethylene includes filtering contaminants from a polyethylene/n-pentane solution where in the polyethylene is dissolved at a mass percent concentration up to 20%. In another embodiment, the polyethylene is dissolved at a mass percent concentration up to 18%. In another embodiment, the polyethylene is dissolved at a mass percent concentration up to 16%. In another embodiment, the polyethylene is dissolved at a mass percent concentration up to 14%. In another embodiment, the polyethylene is dissolved at a mass percent concentration up to 12%.

Purification

In one embodiment of the present invention, a method for purifying polyethylene includes contacting a contaminated polymer solution with solid media at a temperature and at a pressure wherein the polymer remains dissolved in the fluid solvent. The solid media of the present invention, also referred to throughout the present invention as adsorption media or adsorption filtration media, comprise solid media particles and are any solid materials that remove at least some of the contamination from a solution of reclaimed polyethylene dissolved in the fluid solvent of the present invention. Although not wishing to be bound by any theory, the applicants believe that the solid media remove contamination by a variety of mechanisms. Non-limiting examples of possible mechanisms include adsorption, absorption, electrostatics, size exclusion, ion exclusion, ion exchange, and other mechanisms that may be apparent to those having ordinary skill in the art. Furthermore, the pigments and other contaminants commonly found in reclaimed polyethylene may be polar compounds or may have polar compounds on their surfaces and may preferentially interact with the solid media, which may also be at least slightly polar. The polar-polar interactions are especially favorable when non-polar solvents, such as alkanes, are used as the fluid solvent.

In one embodiment of the present invention, the solid media are selected from the group consisting of inorganic substances, carbon-based substances, or mixtures thereof. Useful examples of inorganic substances include oxides of silicon, oxides of aluminum, oxides of iron, aluminum silicates, magnesium silicates, amorphous volcanic glasses, silica, silica gel, diatomite, sand, quartz, reclaimed glass, alumina, perlite, fuller's earth, bentonite, and mixtures thereof. Useful examples of carbon-based substances include anthracite coal, carbon black, coke, activated carbon, cellulose, and mixtures thereof. In another embodiment of the present invention, the solid media are recycled glasses. In yet another embodiment of the present invention, the solid media particles are selected from the group consisting of solid particles of silicon oxide (silica), silica gel, aluminum oxide (alumina), activated alumina, iron oxide, aluminum silicate, magnesium silicate, sand, quartz, diatomaceous earth, zeolite, molecular sieve, perlite, clay, fuller's earth, bentonite clay, metal organic framework (MOF), covalent organic framework (COF), zeolitic imidazolate framework (ZIF), cellulose, and lignocellulose. In even yet another embodiment of the present invention, the solid media are selected from the group consisting of silica, activated alumina, silica gel, fuller's earth, bentonite clay, and mixtures thereof. In one embodiment of the present invention, the solid media are selected from the group consisting of activated carbon, activated alumina, diatomaceous earth, and mixtures thereof. In another embodiment of the present invention, the solid media are selected from the group consisting of MOF, COF, ZIF, activated carbon, activated alumina, and mixtures thereof. In yet another embodiment of the present invention, the solid media are selected from the group consisting of diatomaceous earth, activated alumina, and mixtures thereof.

A non-limiting example of the physical mode of action is physical adsorption (also called physisorption), where a dissolved contaminant gets adsorbed onto the external surface or internal surface of pores of a filter particle due to van der Waals forces, and thus separated from the filtration feed stream. Another non-limiting example of the physical mode of action is electrostatic adsorption, where a suspended contaminant gets adsorbed onto the surface of a filter particle due to electrostatic attraction. The filter particles and media that remove contaminants primarily by adsorption are called adsorption filter particles and adsorption filter media, respectively.

The adsorption filtration medium is typically contained in a cylindrical filter container as either a loose medium or a bonded block, and the adsorption filtration can be either axial flow or radial flow. The cylindrical adsorption filter medium in axial flow has an aspect ratio defined as the ratio of the height to the diameter of the cylindrical adsorption filter medium. In one embodiment of the present invention, the aspect ratio of the cylindrical adsorption filter medium is equal to or greater than about 1. In another embodiment of the present invention, the aspect ratio of the cylindrical adsorption filter medium is equal to or greater than about 2. In yet another embodiment of the present invention, the aspect ratio of the cylindrical adsorption filter medium is equal to or greater than about 5. In even yet another embodiment of the present invention, the aspect ratio of the cylindrical adsorption filter medium is equal to or greater than about 10. In one embodiment of the present invention, the aspect ratio of the cylindrical adsorption filter medium is equal to or greater than about 30. In another embodiment of the present invention, the aspect ratio of the cylindrical adsorption filter medium is equal to or greater than about 50. In yet another embodiment of the present invention, the aspect ratio of the cylindrical adsorption filter medium is equal to or greater than about 70.

In one embodiment of the present invention, the height of the cylindrical adsorption filter medium is equal to or greater than about 5 cm. In another embodiment of the present invention, the height of the cylindrical adsorption filter medium is equal to or greater than about 20 cm. In yet another embodiment of the present invention, the height of the cylindrical adsorption filter medium is equal to or greater than about 50 cm. In even yet another embodiment of the present invention, the height of the cylindrical adsorption filter medium is equal to or greater than about 1 m. In one embodiment of the present invention, the height of the cylindrical adsorption filter medium is equal to or greater than about 1.5 m. In another embodiment of the present invention, the height of the cylindrical adsorption filter medium is equal to or greater than about 3 m. In yet another embodiment of the present invention, the height of the cylindrical adsorption filter medium is equal to or greater than about 6 m.

In one embodiment of the present invention, the adsorption filter medium is cylindrical; wherein the filter medium comprises loose adsorption filter particles; wherein the height of the cylindrical adsorption medium is about 122 cm; wherein the diameter of the cylindrical adsorption medium is about 1.7 cm; wherein the adsorption filter particles comprise activated alumina; and wherein the particle size of the adsorption filter particles is 7×14 mesh.

In one embodiment of the present invention, the solid media are contacted with the polymer in a vessel for a specified amount of time while the solid media are agitated. In another embodiment, the solid media are removed from the purer polymer solution via a solid-liquid separation step. Non-limiting examples of solid-liquid separation steps include filtration, decantation, centrifugation, and settling. In another embodiment of the present invention, the contaminated polymer solution is passed through a stationary bed of solid media. In another embodiment of the present invention, the solid media are replaced as needed to maintain a desired purity of polymer. In yet another embodiment, the solid media are regenerated and re-used in the purification step. In another embodiment, the solid media are regenerated by fluidizing the solid media during a backwashing step.

In one embodiment, a method for purifying reclaimed polyethylene includes contacting a polyethylene/fluid solvent solution with solid media at a temperature and at a pressure wherein the polyethylene remains dissolved in the fluid solvent. In one embodiment, a method for purifying reclaimed polyethylene includes contacting a polyethylene/fluid solvent solution with solid media at a temperature from about 90° C. to about 280° C. In another embodiment, a method for purifying reclaimed polyethylene includes contacting a polyethylene/fluid solvent solution with solid media at a temperature from about 110° C. to about 220° C. In one embodiment, a method for purifying reclaimed polyethylene includes contacting a polyethylene/fluid solvent solution with solid media at a pressure from about 200 psig (1.38 MPa) to about 8,000 psig (55.16 MPa). In another embodiment, a method for purifying reclaimed polyethylene includes contacting a polyethylene/fluid solvent solution with solid media at a pressure from about 400 psig (2.76 MPa) to about 2,600 psig (17.93 MPa).

In one embodiment, a method for purifying reclaimed polyethylene includes contacting a polyethylene/n-butane solution with solid media at a temperature from about 90° C. to about 280° C. In another embodiment, a method for purifying reclaimed polyethylene includes contacting a polyethylene/n-butane solution with solid media at a temperature from about 100° C. to about 220° C. In another embodiment, a method for purifying reclaimed polyethylene includes contacting a polyethylene/n-butane solution with solid media at a temperature from about 130° C. to about 180° C. In another embodiment, a method for purifying reclaimed polyethylene includes contacting a polyethylene/n-butane solution with solid media at a pressure from about 4000 psig (27.58 MPa) to about 8,000 psig (55.16 MPa). In another embodiment, a method for purifying reclaimed polyethylene includes contacting a polyethylene/n-butane solution with solid media at a pressure from about 4,200 psig (28.96 MPa) to about 7,000 psig (48.26 MPa). In another embodiment, a method for purifying reclaimed polyethylene includes contacting a polyethylene/n-butane solution with solid media at a pressure from about 4,500 psig (31.03 MPa) to about 6,000 psig (41.37 MPa). In another embodiment, a method for purifying reclaimed polyethylene includes contacting a polyethylene/n-butane solution with solid media wherein the polyethylene is dissolved at a mass percent concentration of at least 0.5%. In another embodiment, the polyethylene is dissolved at a mass percent concentration of at least 1%. In another embodiment, the polyethylene is dissolved at a mass percent concentration of at least 2%. In another embodiment, the polyethylene is dissolved at a mass percent concentration of at least 3%. In another embodiment, the polyethylene is dissolved at a mass percent concentration of at least 4%. In another embodiment, the polyethylene is dissolved at a mass percent concentration of at least 5%. In another embodiment, a method for purifying reclaimed polyethylene includes contacting a polyethylene/n-butane solution with solid media wherein the polyethylene is dissolved at a mass percent concentration up to 20%. In another embodiment, the polyethylene is dissolved at a mass percent concentration up to 18%. In another embodiment, the polyethylene is dissolved at a mass percent concentration up to 16%. In another embodiment, the polyethylene is dissolved at a mass percent concentration up to 14%. In another embodiment, the polyethylene is dissolved at a mass percent concentration up to 12%.

In another embodiment, a method for purifying reclaimed polyethylene includes contacting a polyethylene/n-pentane solution with solid media at a temperature from about 90° C. to about 280° C. In another embodiment, a method for purifying reclaimed polyethylene includes contacting a polyethylene/n-pentane solution with solid media at a temperature from about 100° C. to about 220° C. In another embodiment, a method for purifying reclaimed polyethylene includes contacting a polyethylene/n-pentane solution with solid media at a temperature from about 130° C. to about 180° C. In another embodiment, a method for purifying reclaimed polyethylene includes contacting a polyethylene/n-pentane solution with solid media at a pressure from about 800 psig (5.52 MPa) to about 4,000 psig (27.58 MPa). In another embodiment, a method for purifying reclaimed polyethylene includes contacting a polyethylene/n-pentane solution with solid media at a pressure from about 900 psig (6.21 MPa) to about 3,000 psig (20.68 MPa). In another embodiment, a method for purifying reclaimed polyethylene includes contacting a polyethylene/n-pentane solution with solid media at a pressure from about psig (31.03 MPa) to about 6,000 psig (41.37 MPa). In another embodiment, a method for purifying reclaimed polyethylene includes contacting a polyethylene/n-pentane solution with solid media wherein the polyethylene is dissolved at a mass percent concentration of at least 0.5%. In another embodiment, the polyethylene is dissolved at a mass percent concentration of at least 1%. In another embodiment, the polyethylene is dissolved at a mass percent concentration of at least 2%. In another embodiment, the polyethylene is dissolved at a mass percent concentration of at least 3%. In another embodiment, the polyethylene is dissolved at a mass percent concentration of at least 4%. In another embodiment, the polyethylene is dissolved at a mass percent concentration of at least 5%. In another embodiment, a method for purifying reclaimed polyethylene includes contacting a polyethylene/n-pentane solution with solid media wherein the polyethylene is dissolved at a mass percent concentration up to 20%. In another embodiment, the polyethylene is dissolved at a mass percent concentration up to 18%. In another embodiment, the polyethylene is dissolved at a mass percent concentration up to 16%. In another embodiment, the polyethylene is dissolved at a mass percent concentration up to 14%. In another embodiment, the polyethylene is dissolved at a mass percent concentration up to 12%.

Separation

In one embodiment of the present invention, a method for purifying reclaimed polyethylene includes separating the purer polymer from the fluid solvent at a temperature and at a pressure wherein the polymer precipitates from solution and is no longer dissolved in the fluid solvent. In another embodiment, the precipitation of the purer polymer from the fluid solvent is accomplished by reducing the pressure at a fixed temperature. In another embodiment, the precipitation of the purer polymer from the fluid solvent is accomplished by reducing the temperature at a fixed pressure. In another embodiment, the precipitation of the purer polymer from the fluid solvent is accomplished by increasing the temperature at a fixed pressure. In another embodiment, the precipitation of the purer polymer from the fluid solvent is accomplished by reducing both the temperature and pressure. The solvent can be partially or completely converted from the liquid to the vapor phase by controlling the temperature and pressure. In another embodiment, the precipitated polymer is separated from the fluid solvent without completely converting the fluid solvent into a 100% vapor phase by controlling the temperature and pressure of the solvent during the separation step. The separation of the precipitated purer polymer is accomplished by any method of liquid-liquid or liquid-solid separation. Non-limiting examples of liquid-liquid or liquid-solid separations include filtration, decantation, centrifugation, and settling.

In one embodiment, a method for purifying reclaimed polyethylene includes separating polyethylene from a polyethylene/fluid solvent solution at a temperature and a pressure wherein the polyethylene precipitates from solution. In another embodiment, a method for purifying reclaimed polyethylene includes separating polyethylene from a polyethylene/n-butane solution at a temperature from about 0° C. to about 280° C. In another embodiment, a method for purifying reclaimed polyethylene includes separating polyethylene from a polyethylene/n-butane solution at a temperature from about 50° C. to about 175° C. In another embodiment, a method for purifying reclaimed polyethylene includes separating polyethylene from a polyethylene/n-butane solution at a temperature from about 100° C. to about 220° C. In another embodiment, a method for purifying reclaimed polyethylene includes separating polyethylene from a polyethylene/n-butane solution at a pressure from about 0 psig (0 MPa) to about 2,000 psig (13.79 MPa). In another embodiment, a method for purifying reclaimed polyethylene includes separating polyethylene from a polyethylene/n-butane solution at a pressure from about 50 psig (0.34 MPa) to about 1,500 psig (10.34 MPa). In another embodiment, a method for purifying reclaimed polyethylene includes separating polyethylene from a polyethylene/n-butane solution at a pressure from about 75 psig (0.52 MPa) to about 1,000 psig (6.89 MPa).

In another embodiment, a method for purifying reclaimed polyethylene includes separating polyethylene from a polyethylene/n-pentane solution at a temperature from about 0° C. to about 280° C. In another embodiment, a method for purifying reclaimed polyethylene includes separating polyethylene from a polyethylene/n-pentane solution at a temperature from about 30° C. to about 150° C. In another embodiment, a method for purifying reclaimed polyethylene includes separating polyethylene from a polyethylene/n-pentane solution at a temperature from about 50° C. to about 130° C. In another embodiment, a method for purifying reclaimed polyethylene includes separating polyethylene from a polyethylene/n-pentane solution at a pressure from about 0 psig (0 MPa) to about 2,000 psig (13.79 MPa). In another embodiment, a method for purifying reclaimed polyethylene includes separating polyethylene from a polyethylene/n-pentane solution at a pressure from about 50 psig (0.34 MPa) to about 1,500 psig (10.34 MPa). In another embodiment, a method for purifying reclaimed polyethylene includes separating polyethylene from a polyethylene/n-pentane solution at a pressure from about 75 psig (0.52 MPa) to about 1,000 psig (6.89 MPa).

III Test Methods

The test methods described herein are used to measure the effectiveness of various methods for purifying polymers. Specifically, the methods described demonstrate the effectiveness of a given purification method at improving color and translucency/clarity (i.e. making the color and opacity of the reclaimed polyethylene closer to that of an uncolored virgin polymer), reducing or eliminating elemental contamination (i.e. removing heavy metals), reducing or eliminating non-combustible contamination (i.e. inorganic fillers), and reducing or eliminating volatile compounds (especially volatile compounds that contribute to the malodor of reclaimed polyethylene).

Color and Opacity Measurement:

The color and opacity/translucency of a polymer are important parameters that determine whether or not a polymer can achieve the desired visual aesthetics of an article manufactured from the polymer. Reclaimed polyethylene, especially post-consumer derived reclaimed polyethylene, is typically dark in color and opaque due to residual pigments, fillers, and other contamination. Thus, color and opacity measurements are important parameters in determining the effectiveness of a method for purifying polymers.

Prior to color measurement, samples of either polymeric powders or pellets were compression molded into 30 mm wide×30 mm long×1 mm thick square test specimens (with rounded corners). Powder samples were first densified at room temperature (ca. 20-23° C.) by cold pressing the powder into a sheet using clean, un-used aluminum foil as a contact-release layer between stainless steel platens. Approximately 0.85 g of either cold-pressed powder or pellets was then pressed into test specimens on a Carver Press Model C (Carver, Inc., Wabash, Ind. 46992-0554 USA) pre-heated to 200° C. using aluminum platens, unused aluminum foil release layers, and a stainless steel shim with a cavity corresponding to aforementioned dimensions of the square test specimens. Samples were heated for 5 minutes prior to applying pressure. After 5 minutes, the press was then compressed with at least 2 tons (1.81 metric tons) of hydraulic pressure for at least 5 seconds and then released. The molding stack was then removed and placed between two thick flat metal heat sinks for cooling. The aluminum foil contact release layers were then peeled from the sample and discarded. The flash around the sample on at least one side was peeled to the mold edge and then the sample was pushed through the form. Each test specimen was visually evaluated for voids/bubble defects and only samples with no defects in the color measurement area (0.7" (17.78 mm) diameter minimum) were used for color measurement.

The color of each sample was characterized using the International Commission on Illumination (CIE) L*, a*, b* three dimensional color space. The dimension L* is a measure of the lightness of a sample, with L*=0 corresponding to the darkest black sample and L*=100 corresponding to the brightest white sample. The dimension a* is a measure of the red or green color of a sample with positive values of a* corresponding with a red color and negative values of a* corresponding with a green color. The dimension b* is a measure of the blue or yellow color of a sample with positive values of b* corresponding with a yellow color and negative values of b* corresponding with a blue color. The L*a*b* values of each 30 mm wide×30 mm long×1 mm thick square test specimen sample were measured on a HunterLab model LabScan XE spectrophotometer (Hunter Associates Laboratory, Inc., Reston, Va. 20190-5280, USA). The spectrophotometer was configured with D65 as the standard illuminant, an observer angle of 10°, an area diameter view of 1.75" (44.45 mm), and a port diameter of 0.7" (17.78 mm).

The opacity of each sample, which is a measure of how much light passes through the sample (i.e. a measure of the sample's translucency), was determined using the aforementioned HunterLab spectrophotometer using the contrast ratio opacity mode. Two measurements were made to determine the opacity of each sample. One to measure the brightness value of the sample backed with a white backing, $Y_{White\ Backing}$, and one to measure the brightness value of the sample backed with a black backing, $Y_{BlackBacking}$. The opacity was then calculated from the brightness values using the following Equation 3:

$$\% \text{ Opacity} = \frac{Y_{Black\ Backing}}{Y_{White\ Backing}} * 100 \qquad \text{Equation 3}$$

Elemental Analysis:

Many sources of reclaimed polyethylene have unacceptably high concentrations of heavy metal contamination. The presence of heavy metals, for example lead, mercury, cadmium, and chromium, may prevent the use of reclaimed polyethylene in certain applications, such as food or drug contact applications or medical device applications. Thus, measuring the concentration of heavy metals is important when determining the effectiveness of a method for purifying polymers.

Elemental analysis was performed using Inductively Coupled Plasma Mass Spectrometry (ICP-MS). Test solutions were prepared in n=2 to n=6 depending on sample availability by combining ~0.25 g sample with 4 mL of concentrated nitric acid and 1 mL of concentrated hydrofluoric acid (HF). The samples were digested using an Ultrawave Microwave Digestion protocol consisting of a 20 min ramp to 125° C., a 10 min ramp to 250° C. and a 20 min hold at 250° C. Digested samples were cooled to room temperature. The digested samples were diluted to 50 mL after adding 0.25 mL of 100 ppm Ge and Rh as the internal standard. In order to assess accuracy of measurement, pre-digestion spikes were prepared by spiking virgin polymer. Virgin polymer spiked samples were weighed out using the same procedure mentioned above and spiked with the appropriate amount of each single element standard of interest, which included the following: Na, Al, Ca, Ti, Cr, Fe, Ni, Cu, Zn, Cd, and Pb. Spikes were prepared at two different levels: a "low level spike" and a "high level spike". Each spike was prepared in triplicate. In addition to spiking virgin polymer, a blank was also spiked to verify that no errors occurred during pipetting and to track recovery through the process. The blank spiked samples were also prepared in triplicate at the two different levels and were treated in the same way as the spiked virgin polymer and the test samples. A 9 point calibration curve was made by making 0.05, 0.1, 0.5, 1, 5, 10, 50, 100, and 500 ppb solutions containing Na, Al, Ca, Ti, Cr, Fe, Ni, Cu, Zn, Cd, and Pb. All calibration standards were prepared by dilution of neat standard reference solutions and 0.25 mL of 100 ppm Ge and Rh as the internal standard with 4 mL of concentrated nitric and 1 mL of concentrated HF. Prepared standards, test samples, and spiked test samples were analyzed using an Agilent's 8800 ICP-QQQMS, optimized according to manufacturer recommendations. The monitored m/z for each analyte and the collision cell gas that was used for analysis was as follows: Na, 23 m/z, $H_2$; Al, 27 m/z, $H_2$; Ca, 40 m/z, $H_2$; Ti, 48 m/z, $H_2$; Cr, 52 m/z, He; Fe, 56 m/z, $H_2$; Ni, 60 m/z; no gas; Cu, 65 m/z, no gas; Zn, 64 m/z, He; Cd, 112 m/z; $H_2$; Pb, sum of 206≥206, 207≥207, 208≥208 m/z, no gas; Ge, 72 m/z, all modes; Rh, 103 m/z, all modes. Ge was used as an internal standard for all elements <103 m/z and Rh was used for all elements >103 m/z.

Residual Ash Content:

Many sources of reclaimed polyethylene contain various fillers, for example calcium carbonate, talcum, and glass fiber. While useful in the original application of the reclaimed polyethylene, these fillers alter the physical properties of a polymer in way that may be undesired for the next application of the reclaimed polyethylene. Thus, measuring the amount of filler is important when determining the effectiveness of a method for purifying polymers.

Thermogravimetric analysis (TGA) was performed to quantify the amount of non-combustible materials in the sample (also sometimes referred to as Ash Content). About 5-15 mg of sample was loaded onto a platinum sample pan and heated to 700° C. at a rate of 20° C./min in an air atmosphere in a TA Instruments model Q500 TGA instrument. The sample was held isothermal for 10 min at 700° C. The percentage residual mass was measured at 700° C. after the isothermal hold.

Odor Analysis:

Odor sensory analysis was performed by placing about 3 g of each sample in a 20 mL glass vial and equilibrating the sample at room temperature for at least 30 min. After equilibration, each vial was opened and the headspace was sniffed (bunny sniff) by a trained grader to determine odor intensity and descriptor profile. Odor intensity was graded according to the following scale:

5=Very Strong
4=Strong
3=Moderate
2=Weak to Moderate
1=Weak
0=No odor

Every document cited herein, including any cross reference or related patent or patent application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggest or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modification can be made without departing from the spirit and scope of the invention. It is therefore intended to cover in the appended claims all such changes and modification that are within the scope of the present invention.

What is claimed is:

1. A method for purifying a reclaimed polyethylene comprising:
   a. obtaining the reclaimed polyethylene wherein said reclaimed polyethylene is selected from the group consisting of post-consumer use polymers, post-industrial use polymers, and combinations thereof;
   b. contacting the reclaimed polyethylene at a temperature from about 80° C. to about 280° C. and at a pressure from about 150 psig (1.03 MPa) to about 8,000 psig (55.16 MPa) with a first fluid solvent having a standard boiling point less than about 70° C., to produce an extracted reclaimed polyethylene;
   c. dissolving the extracted reclaimed polyethylene in a solvent selected from the group consisting of the first fluid solvent, a second fluid solvent, and mixtures thereof, at a temperature from about 90° C. to about 280° C. and a pressure from about 200 psig (1.38 MPa) to about 8,000 psig (55.16 MPa) to produce a first solution comprising polyethylene, at least one dissolved contaminant, and at least one suspended contaminant;
   d. settling said first solution comprising polyethylene, at least one dissolved contaminants, and at least one suspended contaminant at a temperature from about 90° C. to about 280° C. and at a pressure from about 200 psig (1.38 MPa) to about 8,000 psig (55.16 MPa) to produce a second solution comprising polyethylene, at least one dissolved contaminant, and less of the at least one suspended contaminant;
   e. filtering said second solution at a temperature from about 90° C. to about 280° C. and at a pressure from about 200 psig (1.38 MPa) to about 8,000 psig (55.16 MPa) to produce a third solution comprising purer polyethylene, at least one dissolved contaminant, and even less of the at least one suspended contaminant; and
   f. separating said purer polyethylene from said third solution; and
   wherein said second fluid solvent has the same chemical composition or a different chemical composition as the first fluid solvent.

2. The method of claim 1, wherein said purer polyethylene is separated from said third solution at a temperature from about 0° C. to about 280° C. and a pressure from about 0 psig (0 MPa) to 2,000 psig (13.79 MPa).

3. The method of claim 1, wherein said reclaimed polyethylene is dissolved in the fluid solvent, or fluid solvent mixture, at a mass percent concentration of at least 0.5%.

4. The method of claim 1, wherein said reclaimed polyethylene is post-consumer recycle derived polyethylene.

5. The method of claim 1, wherein said reclaimed polyethylene is a polyethylene homopolymer or a primarily polyethylene copolymer.

6. The method of claim 1, wherein said fluid solvent has a standard boiling point less than about 0° C. and greater than about −45° C. and a standard enthalpy change of vaporization of less than about +25 kJ/mol.

7. The method of claim 1, wherein said fluid solvent is selected from the group consisting of olefinic hydrocarbons, aliphatic hydrocarbons, and mixtures thereof.

8. The method of claim 7, wherein said aliphatic hydrocarbon is selected from the group consisting of $C_1$-$C_6$ aliphatic hydrocarbons and mixtures thereof.

9. The method of claim 8, wherein said aliphatic hydrocarbons and mixtures thereof is comprised of primarily $C_4$ aliphatic hydrocarbons.

10. The method of claim 1, wherein said fluid solvent comprises $C_4$ liquefied petroleum gas.

11. The method of claim 1, wherein said fluid solvent comprises n-butane, butane isomers, or mixtures thereof.

12. The method of claim 1, wherein said fluid solvent comprises n-pentane, isomers of pentane, or mixtures thereof.

13. The method of claim 1, wherein said temperature in the contacting, dissolving, settling and filtering steps is from about 110° C. to about 220° C.

14. The method of claim 1, wherein said pressure in the contacting step is from about 400 psig (2.76 MPa) to about 2,400 psig (16.55 MPa).

15. A method for purifying a reclaimed polyethylene comprising:
   a. obtaining the reclaimed polyethylene wherein said reclaimed polyethylene is selected from the group consisting of post-consumer use polymers, post-industrial use polymers, and combinations thereof;
   b. contacting the reclaimed polyethylene at a temperature from about 80° C. to about 280° C. and at a pressure from about 150 psig (1.03 MPa) to about 8,000 psig (55.16 MPa) with a first fluid solvent having a standard boiling point less than about 70° C., to produce an extracted reclaimed polyethylene;
   c. dissolving the extracted reclaimed polyethylene in a solvent selected from the group consisting of the first fluid solvent, a second fluid solvent, and mixtures thereof, at a temperature from about 90° C. to about 280° C. and a pressure from about 200 psig (1.38 MPa) to about 8,000 psig (55.16 MPa) to produce a first solution comprising polyethylene, at least one dissolved contaminant, and at least one suspended contaminant;
   d. settling said first solution comprising polyethylene, at least one dissolved contaminants, and at least one suspended contaminant at a temperature from about 90° C. to about 280° C. and at a pressure from about 200 psig (1.38 MPa) to about 8,000 psig (55.16 MPa) to produce a second solution comprising polyethylene, at least one dissolved contaminant, and less of the at least one suspended contaminant;
   e. filtering said second solution at a temperature from about 90° C. to about 280° C. and at a pressure from about 200 psig (1.38 MPa) to about 8,000 psig (55.16 MPa) to produce a third solution comprising purer polyethylene, at least one dissolved contaminant, and even less of the at least one suspended contaminant; and
   f. purifying by further filtering said third solution at a temperature from about 90° C. to about 280° C. and at a pressure from about 200 psig (1.38 MPa) to about 8,000 psig (55.16 MPa) by contacting said third solution with one or more solid media to produce a fourth solution comprising purer polyethylene; and g. separating said purer polyethylene from said fourth solution; and wherein said second fluid solvent has the same chemical composition or a different chemical composition as the first fluid solvent.

16. The method of claim 15, wherein said purer polyethylene is separated from said forth solution at a temperature from about 0° C. to about 280° C. and a pressure from about 0 psig (0 MPa) to 2,000 psig (13.79 MPa).

17. The method of claim 15, wherein said reclaimed polyethylene is dissolved in the fluid solvent, or fluid solvent mixture, at a mass percent concentration of at least 0.5%.

18. The method of claim 15, wherein said reclaimed polyethylene is post-consumer recycle derived polyethylene.

19. The method of claim 15, wherein said reclaimed polyethylene is a polyethylene homopolymer or a primarily polyethylene copolymer.

20. The method of claim 15, wherein said fluid solvent has a standard boiling point less than about 0° C. and greater than about −45° C. and a standard enthalpy change of vaporization of less than about +25 kJ/mol.

* * * * *